(12) United States Patent
Czerepka et al.

(10) Patent No.: US 11,097,932 B1
(45) Date of Patent: Aug. 24, 2021

(54) GRAPPLE TRUCK WITH A SIDE LOADER

(71) Applicant: Petersen Industries, Inc., Lake Wales, FL (US)

(72) Inventors: John Czerepka, Lake Wales, FL (US); David Hamp Osburn, III, Lake Wales, FL (US)

(73) Assignee: PETERSEN INDUSTRIES, INC., Lake Wales, FL (US)

( * ) Notice: Subject to any disclaimer, the term of this patent is extended or adjusted under 35 U.S.C. 154(b) by 0 days.

(21) Appl. No.: 16/893,880

(22) Filed: Jun. 5, 2020

(51) Int. Cl.
 *B60P 1/48* (2006.01)
 *B60P 1/54* (2006.01)
 (Continued)

(52) U.S. Cl.
 CPC ............ *B66F 9/065* (2013.01); *B60K 5/00* (2013.01); *B60P 1/48* (2013.01); *B60P 1/54* (2013.01);
 (Continued)

(58) Field of Classification Search
 CPC ...... B65F 2003/0296; B65F 2003/0269; B65F 2003/0293; B65F 2003/0283;
 (Continued)

(56) References Cited

U.S. PATENT DOCUMENTS 2,808,947 A * 10/1957 Shippy .................. B65F 3/08
 414/409
3,576,265 A * 4/1971 Brady .................... B65F 3/04
 414/338

(Continued)

FOREIGN PATENT DOCUMENTS

| CN | 203581750 U | 5/2014 |
|---|---|---|
| CN | 204110709 U | 1/2015 |

(Continued)

OTHER PUBLICATIONS

KB-20 Series; www.e-pac-mac.com/products/kb-20-series (Jun. 17, 2018).

(Continued)

*Primary Examiner* — Kaitlin S Joerger
(74) *Attorney, Agent, or Firm* — The Concept Law Group, PA; Robert C. Kain, Jr.

(57) ABSTRACT

A grapple truck with side loader having a generally J-shaped scoop in a lateral recess of the truck bed sidewall. Sometimes loader is longitudinally truncated forming an adjacent debris-bin vertical transport. The power lift system is either a direct lift-pivot with cylinder lifters or a channel-guided lifter with candy-cane shaped channels. Side loader rises from a low, manual loading position to an upper inverted dump position whereat loader displaces debris into truck bed box. Scoop's loader edge is planarly coextensive or inboard truck sidewall, and at or beneath the truck wheel axis line. A chassis mounted, articulated boom, with longitudinally extending arm segments, terminates in a grapple jaw. The articulated boom and grapple jaw has a longitudinally foreshortened stored position in and above the truck bed. In multiple operative positions, the arm extends beyond the truck bed and rear bed wall and laterally over and beyond truck sidewalls.

20 Claims, 14 Drawing Sheets

FIG. 2,3,4

(51) Int. Cl.
*B65F 3/02* (2006.01)
*B66F 9/065* (2006.01)
*B60K 5/00* (2006.01)
*B62D 33/06* (2006.01)
*B62D 21/02* (2006.01)

(52) U.S. Cl.
CPC .............. *B62D 21/02* (2013.01); *B62D 33/06* (2013.01); *B65F 3/02* (2013.01)

(58) Field of Classification Search
CPC .......... B65F 2003/025; B65F 2003/023; B65F 3/04; B65F 3/0206; B65F 3/02; B66C 1/427
See application file for complete search history.

(56) References Cited

U.S. PATENT DOCUMENTS

| | | | |
|---|---|---|---|
| 3,786,949 A | 1/1974 | Sutton | |
| 3,954,194 A | 5/1976 | Stedman | |
| 4,012,069 A | 3/1977 | Carson | |
| 4,218,170 A | 8/1980 | Goodacre | |
| 4,597,710 A | 7/1986 | Kovats | |
| 4,669,940 A | 6/1987 | Englehardt et al. | |
| 4,872,801 A | 10/1989 | Yeazel et al. | |
| 4,915,570 A | 4/1990 | Rath et al. | |
| 4,981,411 A | 1/1991 | Ramsey | |
| 5,035,563 A | 7/1991 | Mezey | |
| 5,035,564 A * | 7/1991 | Matsumoto | B65F 3/08 414/409 |
| 5,044,863 A | 9/1991 | LaBass et al. | |
| 5,071,303 A | 12/1991 | Carson | |
| 5,092,731 A | 3/1992 | Jones et al. | |
| 5,122,025 A | 6/1992 | Glomski | |
| 5,163,805 A * | 11/1992 | Mezey | B65F 1/004 414/810 |
| 5,205,698 A | 4/1993 | Mezey | |
| 5,238,359 A | 8/1993 | Chen | |
| 5,256,027 A | 10/1993 | Guest | |
| 5,288,196 A | 2/1994 | Horning et al. | |
| 5,316,430 A | 5/1994 | Horning et al. | |
| 5,344,273 A | 9/1994 | Radlein | |
| 5,393,180 A | 2/1995 | Van Den Aarsen | |
| 5,427,496 A | 6/1995 | Ratledge, Jr. et al. | |
| 5,639,201 A * | 6/1997 | Curotto | B65F 1/122 294/86.4 |
| 5,702,225 A | 12/1997 | Ghibaudo | |
| 5,769,594 A | 6/1998 | Kalua | |
| 5,795,031 A | 8/1998 | Hagenbuch et al. | |
| 5,813,818 A | 9/1998 | McNeilus et al. | |
| 5,924,325 A | 7/1999 | Brucher et al. | |
| 6,000,472 A | 12/1999 | Albright et al. | |
| 6,089,813 A | 7/2000 | McNeilus et al. | |
| 6,146,078 A | 11/2000 | Hamill et al. | |
| 6,146,079 A | 11/2000 | Ghibaudo | |
| 6,206,477 B1 | 3/2001 | Rexus et al. | |
| 6,210,094 B1 * | 4/2001 | McNeilus | B65F 3/001 414/409 |
| 6,213,706 B1 | 4/2001 | Christenson | |
| 6,250,873 B1 | 6/2001 | Stragier | |
| 6,390,758 B1 | 5/2002 | McNeilus et al. | |
| 6,491,489 B1 | 12/2002 | Stragier | |
| 6,494,665 B1 | 12/2002 | Bingman | |
| 6,821,077 B2 | 11/2004 | Neufeldt | |
| 7,037,061 B2 | 5/2006 | Hund, Jr. et al. | |
| 7,452,175 B2 * | 11/2008 | Martin | B65F 3/001 414/408 |
| 7,866,934 B2 | 1/2011 | Osburn et al. | |
| 7,871,235 B2 | 1/2011 | Jones et al. | |
| 9,102,468 B2 | 8/2015 | Goedken et al. | |
| 9,278,804 B2 | 3/2016 | Goedken et al. | |
| 9,834,377 B1 | 12/2017 | Hayes et al. | |
| 10,501,264 B2 | 12/2019 | Flood et al. | |
| 2002/0098070 A1 | 7/2002 | Neufeldt | |
| 2004/0170492 A1 * | 9/2004 | Neufeldt | B65F 3/02 414/487 |
| 2005/0123384 A1 | 6/2005 | Tomassoni | |
| 2009/0245989 A1 | 10/2009 | Mickelson | |
| 2016/0159571 A1 | 6/2016 | Arrez | |
| 2016/0304277 A1 | 10/2016 | Rowland et al. | |
| 2019/0161272 A1 | 5/2019 | Betz, II et al. | |
| 2019/0210798 A1 | 7/2019 | Schultz | |
| 2019/0345973 A1 | 11/2019 | Gentry et al. | |
| 2020/0180860 A1 * | 6/2020 | Searle | B65F 3/046 |

FOREIGN PATENT DOCUMENTS

| | | | | |
|---|---|---|---|---|
| DE | 202017106409 U1 * | 1/2019 | | B65F 3/02 |
| FR | 2 559 141 A3 | 8/1985 | | |
| KR | 101071957 B1 * | 10/2011 | | B65F 3/02 |
| KR | 102223555 B1 * | 3/2021 | | B65F 3/02 |
| WO | WO 94/05569 | 3/1994 | | |
| WO | WO 96/17750 | 6/1996 | | |
| WO | WO 2009/111816 A1 | 9/2009 | | |
| WO | WO 2011/155921 A1 | 12/2011 | | |
| WO | WO-2011155921 A1 * | 12/2011 | | B65F 3/08 |
| WO | WO 2019/033201 A1 | 2/2019 | | |

OTHER PUBLICATIONS

Toter Residential; www.wayfairsupply.com (Sep. 30, 2016).
Grapple Truck Service for Collection System by Petersen Industries; www.petersenind.com (Mar. 13, 2020).
MP8000 Brochure; MP8000 Dual Stand-up Drive Combo by GSP Marketing Inc. (2019).

* cited by examiner

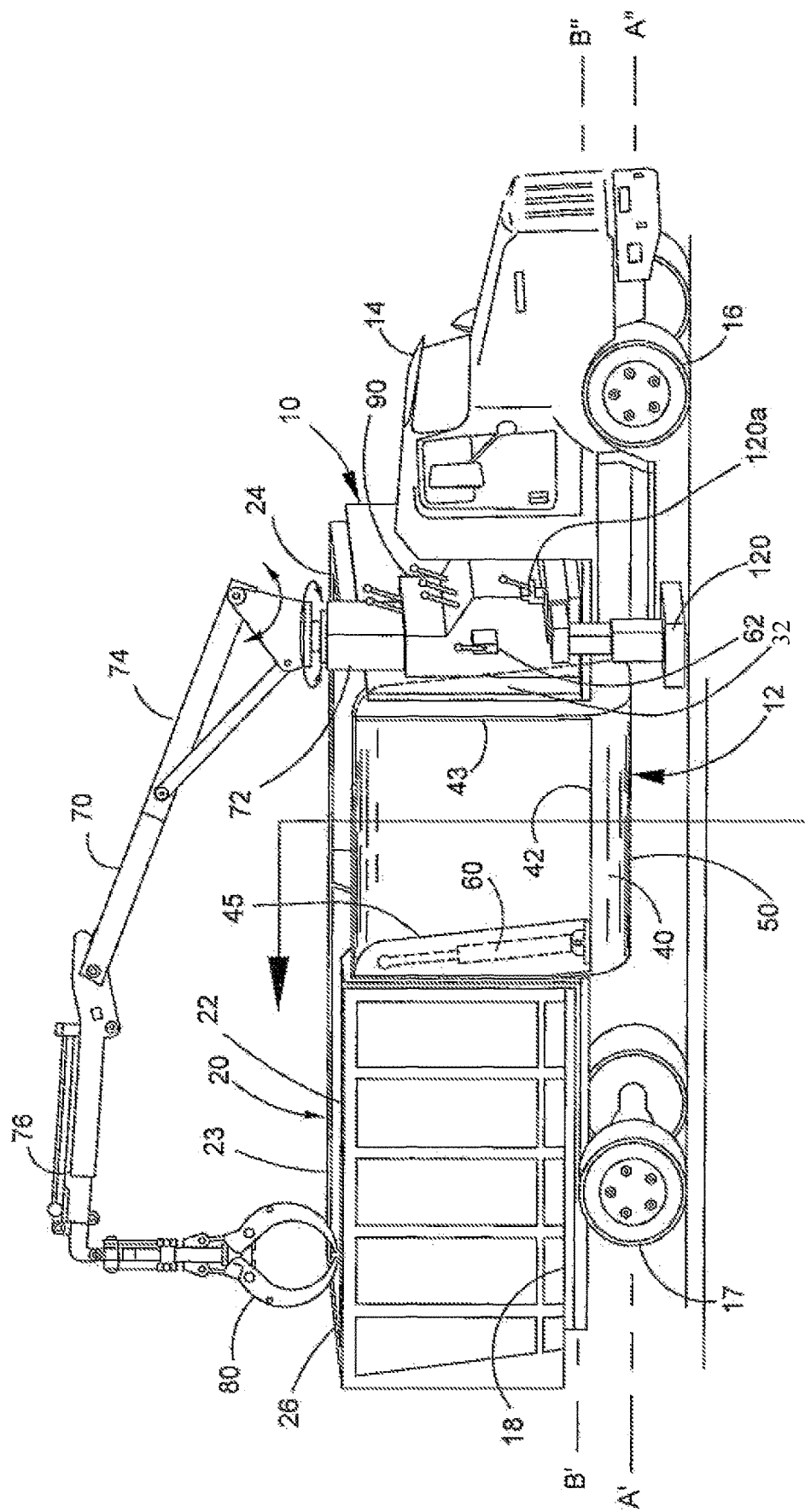

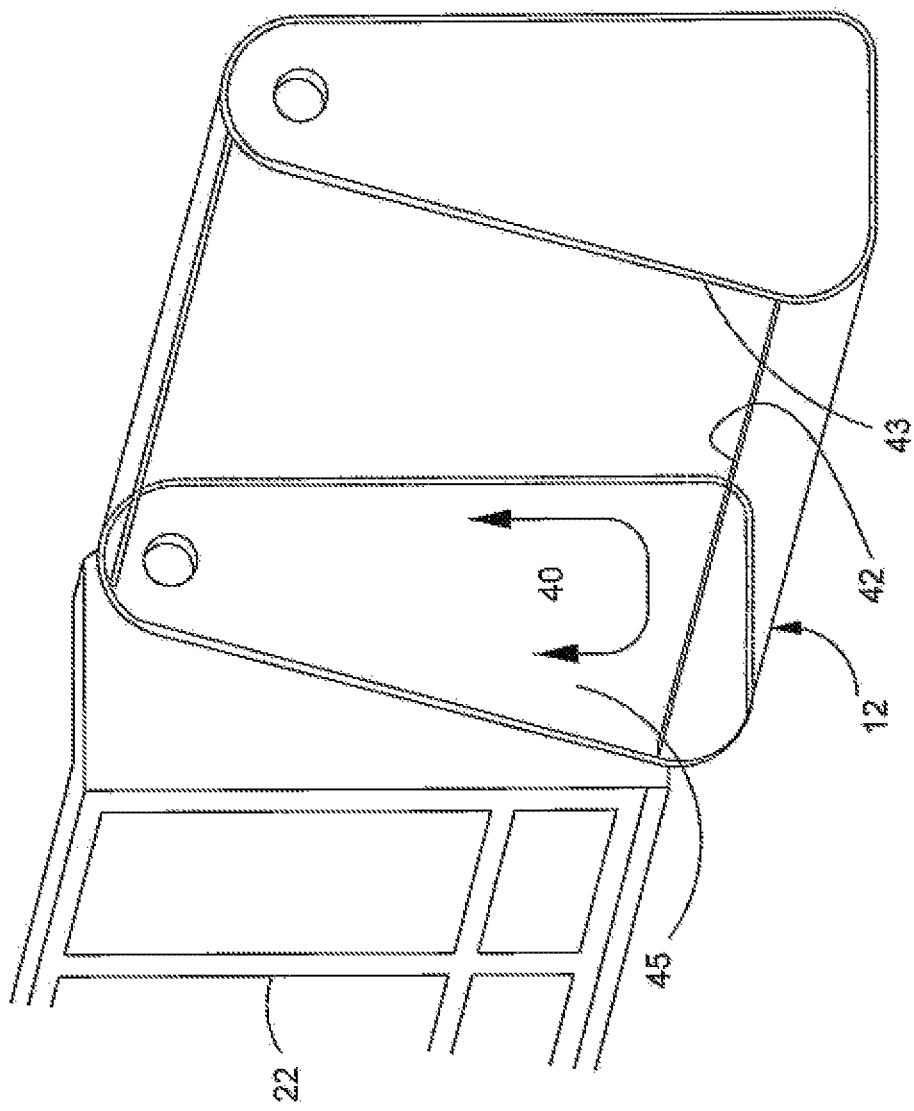

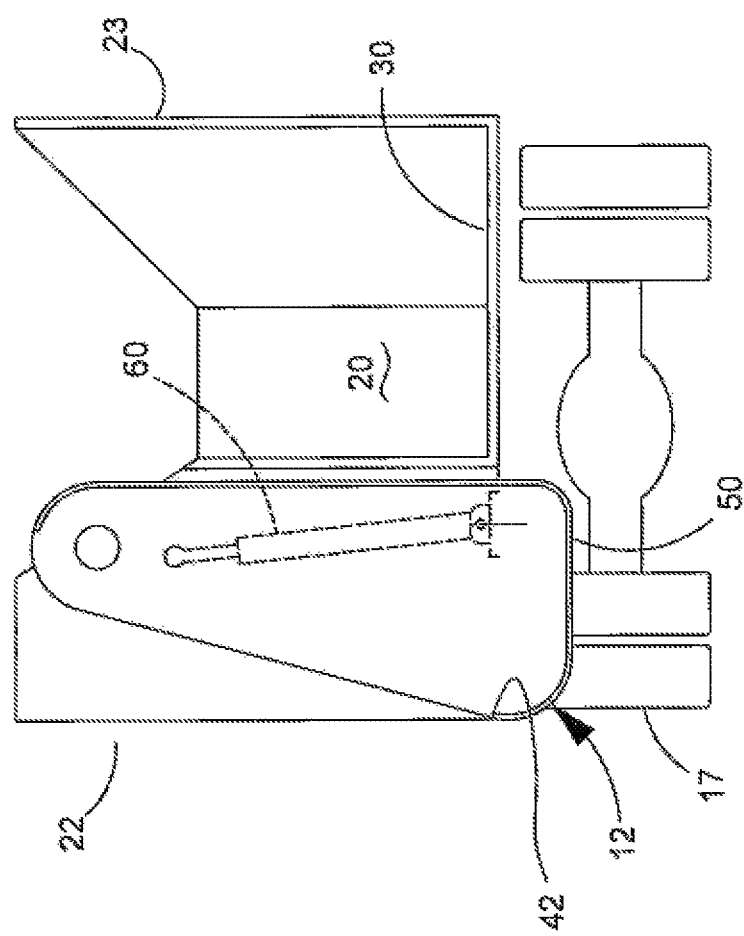

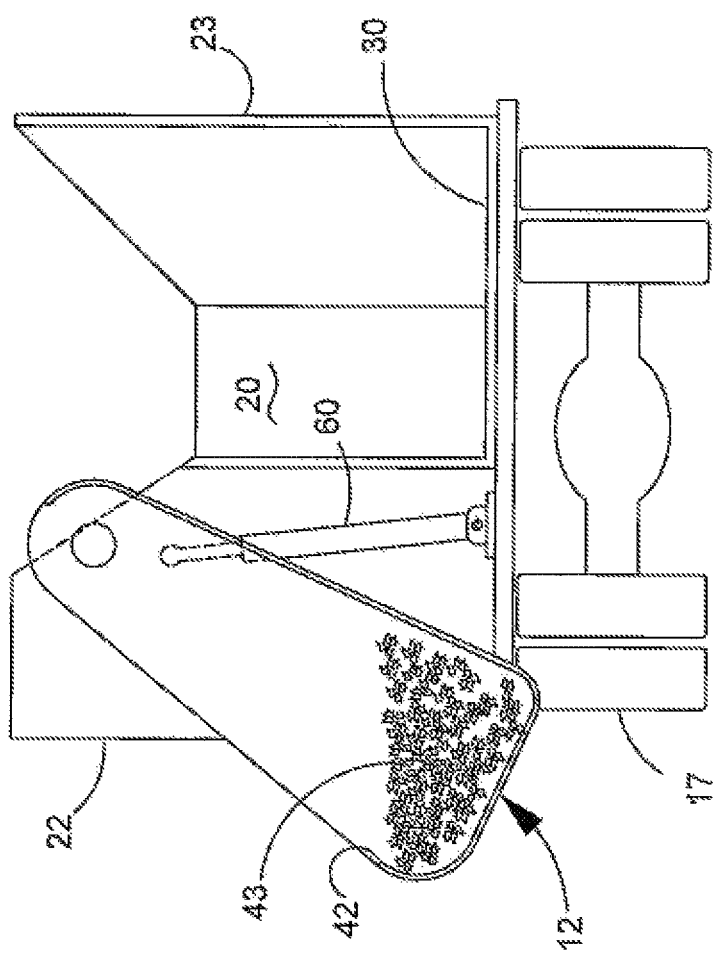

GRAPPLE TRUCK WITH A SIDE LOADER

BACKGROUND OF THE INVENTION

Various grapple trucks are disclosed the prior art. A grapple truck has an articulated boom arm which terminates in a grabbing jaw or claw-like debris gripper. Debris is lifted off the ground and dropped in the open top truck bed. U.S. Pat. No. 7,866,934 to Osburn discloses a removable open top truck bed (with sidewalls and forward and rear walls) with an articulated boom arm which terminates in a grapple jaw. The entire open top truck bed can be rolled onto a truck chassis when empty, then when full of debris, the truck bed is rolled off of the truck chassis by a rail system.

There are also many trucks with side loaders. U.S. Pat. No. 4,012,069 to Carson discloses a side loading apparatus operable about the entire longitudinal side of the open top truck bed, that is, the side loader extends the entire longitudinal span of the truck bed. The side loader has a lifting head longitudinally movable on a rail back and forth along the side of the truck. The lifting head and longitudinal rail is connected to a lifting boom. U.S. Pat. No. 10,501,264 to Flood et al discloses a truck handling refuse containers. The trash receiver bin is located on a side loading vehicle. The trash barrel is grabbed by laterally extending arms from side transfer mechanism which lifts the trash barrel receptacle and dumps the trash into the open top trash container on the truck chassis. U.S. Pat. No. 6,390,758 to McNeilus discloses an apparatus for collecting refuse having a charging hopper and an extensible boom mechanism. The charging hopper extends longitudinally along the truck body. U.S. Pat. No. 5,316,430 to Horning discloses a material collecting apparatus having a bucket moveable between a loading position and a discharge position that travels along a path in close proximity to the truck body sidewall. U.S. Pat. No. 4,981,411 to Ramsey discloses a waste collection and transport body mounted to the frame of a truck. The loading buckets are moved proximate to the wall of the waste body on roller tracks pulled by hinged lift arms. To increase loading speed, hydraulic motors drive each set of lift arms connected to a torque tube. U.S. Pat. No. 6,206,477 to Rexus discloses a yard waste handling apparatus a hopper that is lifted from a loading position to a raised position using a lift arm that is pivotally connected to a dump box. U.S. Pat. No. 6,390,758 to McNeilus discloses a side loader wherein (a) the top edge of the side debris hoppers are near the top of the longitudinal line defined by the top of the front wheel and the top of the rear truck wheels and (b) the bottom of the side debris hoppers are on the longitudinal line defined by the center axis of the front wheel and the center axis of rear truck wheels. U.S. Pat. No. 7,452,175 to Martin discloses a debris truck with side loaders on both sides which side loaders, when lifted, follow a candy-cane shaped track. However, the Martin system does not accommodate a grapple system operable over the truck bed and beyond.

One brochure discloses a KB-20 Series boom truck with an articulating boom arm, a grapple jaw set at the terminal end of the articulating arm and a side hopper bin attached to a raiseable hopper arm. The KB boom truck has a side hopper stored beneath the chassis of the truck. The side hopper is first pulled away from its under-truck storage position, then is laterally pulled away from the truck sidewalls and laterally away from the longitudinal truck chassis. Thereafter, the outboard extending jaws of the hopper arm engage complimentary inverted U-shaped channels or O-shaped channels along the side of the hopper bin. The hopper arms then lift the hopper bin over the side wall of the open top truck bed. Lastly, the hopper arm rotates or twists the hopper bin upside down to empty the bin contents into the open top truck bed container. To store the hopper bin, a reverse operation is effected and the hopper bin is then stored beneath the truck chassis.

U.S. Pat. No. 7,452,175 to Martin shows a side loading trough for a garbage truck with a hopper. The Martin side loading refuse truck is not a grapple truck in that it does not have an articulated grapple arm or a grapple jaw set carried by the truck. The Martin system includes an open top trough and, on the outboard or front face of the trough, a bin hook carrier whereby non-garbage debris bins can be picked up by the vertically movable trough system. Further, the articulating arms on the Martin trough are disposed on the laterally sidewalls of the trough. The Martin system does not have a trough bin which dumps debris into the open top truck bed body of a grapple truck. The Martin system includes an ejector, a packer, and a hopper to push the debris from a forward truck bed section into the back of a closed truck bed. In this manner, the Martin system has a compacting function.

None of the prior art references disclose a compact grapple truck with a side loader wherein the articulated boom arm can be fully stored on the truck bed when not is use and a side loader easily accessible by persons walking next to the truck such that debris can be manually placed into the side loader and a lift system, operable on the side loader side of the truck lifts the debris and deposits the debris into the truck bed. The inventive compact grapple truck with side loader as a side loader when, in full down position, the side line of the side loader is coextensive with the side line of the truck bed side walls. Both the side loader and the side of the truck bed fall in the same longitudinal plane. In other words, the side loader bucket does not extend laterally beyond the side panel of the truck bed box. Also, the compact truck has a side loader bucket edge which is either generally coextensive with the top wheel line defined by the front and rear truck wheels or is below the top wheel line (that is, at or below the top wheel line). The bottom of the side loader bucket is either generally coextensive with the wheel line through the front and rear truck wheel axles or below the axle wheel line. In this manner, the side loader bucket can be easily loaded by a person working along the side of the truck.

OBJECTS OF THE INVENTION

It is an object of the present invention to provide a compact grapple truck with a side loader that can be manually filled with debris by a user walking alongside the truck. It is a further object of the present invention to provide a compact grapple truck wherein the height of the truck is limited and the articulating boom arm can be longitudinally foreshorten such that the grapple tool of jaws can be placed on the truck bed when not in use.

It is an additional object of the present invention to provide controls for the side loader next to the loading staging area on the truck.

It is another object of the present invention to provide laterally extending stabilization standards for the grapple truck to stabilize the truck along its left and right sides during grapple operations.

It is a further object of the present invention to provide a grapple truck with a side loader wherein the side loader is generally vertically movable up and down the side of the grapple truck and the guide track for this combination is a candy-cane shape permitting the deposit of trash and debris by flipping over the side loader at the upper end of the guide track.

It is a further object of the present invention to provide a grapple truck with a side loader and a bin carrier which is vertically movably mounted on a grapple truck.

It is an additional object of the present invention to provide a load bearing plate system that eliminates or reduces stress on either the single side loader/grapple truck or the combinatory side loader and bin carrier grapple truck by distributing that stress along a backside of the single side loader or a common back plate on the combinatory side loader/bin carrier.

SUMMARY OF THE INVENTION

The grapple truck of the present invention can be configured in with several different features, including but not limited to, different lifting systems, a single side loader and a combinatory side loader and bin carrier. In all embodiments, the grapple truck with a side loader includes an elongated truck chassis and a truck bed open-top box movably mounted on the chassis. The truck box has opposing bed sidewalls longitudinally extending over the chassis, a forward wall behind the cab laterally extending across the chassis, and a rear wall at the end of the truck. The truck box has a box floor bounded by the sidewalls and the forward and rear walls. One sidewall has, at a forward location, a side recess with opposing fore and aft laterally extending recess walls. The recess extend inboard into the truck box.

A side loader is movably mounted in the recess and pivotally mounted at its upper trash or debris dumping position such that debris is deposited in the truck bed. The side loader has a substantially J-shaped open top debris collection scoop wherein an upper leg of the J-shaped scoop is pivotally mounted between the fore and aft recess sidewalls. The J-shaped scoop is open to the side of the truck and has a side loading terminal edge (formed by the J-shaped scoop) which edge is either substantially coextensive with an upper wheel line of the truck wheels or is below the upper wheel line. This permits a manual loading of debris into the J-shaped scoop over the terminal edge. The terminal edge is also substantially planarly coextensive with the one sidewall or it may be laterally inboard of the plane defined by the sidewall of the truck bed. As a result, the J-scoop side loader does not stick laterally away, out or outboard of the truck sidewall.

A lower extremity of the J-shaped scoop is either substantially coextensive with a longitudinal line through respective rotational centerlines of the rear truck wheel (the wheel beneath the adjacent truck bed sidewall, this sidewall defining the side loader recess) and the corresponding front truck wheel or below the axle wheel line.

In some embodiments, the substantially J-shaped side loader is vertically and pivotally movable in and above the truck bed open top box recess. The side loader forms, at its lower extremity, a debris collection scoop. The side loader has an upper leg plate extending from the scoop to its upper extremity which upper extremity pivots with respect to the sidewall of the truck. The J-shape may be squared off rather than have a curved bottom surface.

One, and more preferably two, hydraulic or pneumatic power lift cylinders are engaged to pivotally raise the J-shaped scoop from a lowered position (such position permitting the manual loading of debris into the J-scoop) and an upper dump position whereat the J-shaped scoop is adapted to displace or dump debris from the scoop into the truck box. An electric motor may also be used to raise and lower the side loader. In general, the truck includes a boom power and control operative with an articulated boom, arm and grapple jaw and adapted to raise and lower and extend the grapple jaw over and beyond said open top box. This boom control is mounted on the chassis. The power lift system raises the side loader from a lower, loading position and thereafter pivots the side loader to an inverted upper dump position whereat the scoop discharges debris into the open top box.

The grapple truck has an articulated boom having a support base mounted on the chassis, and an elongated articulated arm swivel mounted on the support base. The articulated arm has at least three degrees of motion (left-right; up-down; and longitudinally extending rearward and forward). The articulated arm has a generally longitudinally extending arm. The articulated boom and arm terminate in a grapple jaw. The grapple jaw has a closed position, adapted to capture debris in its jaw, and has an open position, adapted to release debris into the truck bed. A boom power and control operates the articulated boom, arm and grapple jaw. The power and control extends the grapple jaw over the truck bed, beyond the rear wall and laterally over and beyond the sidewalls. The boom control is mounted on the chassis.

The articulated boom and arm has a stored position with a foreshortened longitudinal arm span. In that stored position, the grapple jaw rests atop the box floor and substantially all of the articulated arm is longitudinally spaced apart and disposed above the box floor. The articulated boom and arm also have multiple operative positions wherein the arm extends the grapple jaw over the truck bed, beyond the rear wall and laterally over and beyond the sidewalls. The rear wall of the truck bed has a dump door to permit emptying debris from the truck box.

In a refined version, the grapple truck has a truck bed pivotally mounted on the chassis at a rearward pivot position. The truck includes a bed lifter mounted between the chassis and the truck bed at a forward position such that the dump door is opened when the bed lifter raises the bed. The boom control is disposed intermediate the cab and the truck bed. Also the grapple truck included a pair of stabilizing standards, one standard for each side of the truck. Each of these stabilizing standards laterally extend away from the chassis beyond the terminal edge of the J-scoop and the respective sidewall. Each motorized stabilizing standard includes a laterally outboard extending element and a vertical extension providing ground stabilization under vertical controlled power.

In another embodiment, the side loader is a half-loader mounted on a common back wall with a bin carrier and this combination loader and carrier is movably mounted on the grapple truck. The grapple truck includes a controllable source of motive power (a pneumatic, hydraulic or electric power lift) to move a single side loader or the combinatory side loader and bin carrier up and down and over the side wall of the open top truck bed container.

The bin carrier includes a common back plate with the side loader and a debris bin vertical transport system with a hook system that hooks onto removable consumer-filled or commercial trash bins. The common back plate forms an inboard wall of the side loader and the vertical back wall support plate for the bin carrier or vertical transport. The debris bin vertical transport has on the vertical support plate portion of the common back plate (the plate common to the side loader), an upper bin hook and a lower bin hook adapted to capture complementary debris bin hook-bars on the removable consumer-filled or commercial trash bins.

Cam following rollers on the single side loader or combinator loader and bin carrier are disposed in forward and rearward track guide channels. The track guide channels are fixed at one end on the truck chassis and on truck bed sidewalls or the forward cab-side truck bed wall or on the recess fore and aft sidewalls. Each track channel has a substantially straight vertical ascent run and an upper loop run which loop curves over an upper edge of the truck bed sidewall, that is, over the recess backwall which is laterally inboard of the truck bed.

Forward and rearward power lift arm sets are movably connected to respective sides of the side loader or, in the combinatory loader plus bin carrier, to one side of the side loader and a forward wall element of the bin carrier. In an alternative embodiment, the powered lift arm set is defined by either (a) the forward or rearward powered arm sets or (b) one powered arm set and the other arm set is a stabilizing arm set. Each arm set has at least two articulating motive arms movably coupled at one end to the singular side loader or the combinatory loader plus bin carrier and coupled, at an opposite end, to respective pivotal drive axles. These pivotal drive axles are mounted adjacent the upper edge of the truck bed recess backwall. If a single power cylinder is used, one drive axle is powered and the other axle is a stabilizing axle for the drive linkage. A knuckle transmission system is coupled between the controllable source of motive power (pneumatic or hydraulic power lift) and the powered arm lift set via the drive axle. Rotational movement of the drive axle raises the solo loader or the combinatory loader plus bin carrier from a lowermost load position to an uppermost dump position. In the dump position, the solo loader or the combinatory loader plus bin carrier is overturned above and laterally atop the open top truck bed, which dump position is laterally inboard the recess backwall.

In one embodiment, the open top trough clears the grapple articulated arm, thereby permitting the trough and bin carrier to clear the grapple articulated arm when the grapple articulated arm is in the first stabilized, stationary position and during trough and bin carrier transition between the load position to the dump position.

Further enhancements include load bearing plates with upper and lower rollers wherein the rollers are disposed in the guide tracks. Additionally, the load bearing plates have an outermost load bearing plate, an intermediate stand-off wedge and an innermost load bearing plate wherein the terminal lower ends of the forward and rearward power arm sets are rotatably mounted between the outermost and innermost load bearing plates. With respect to the powered arm set, the intermediate stand-off wedge between the respective outermost and innermost load bearing plates forms a platform which exclusively transfers and distributes load from the back plate to the powered arm set and, with respect to the stabilization arm set, the intermediate stand-off wedge forms a stability platform between the stabilization arm set and the respective channel track.

The grapple truck may have a direct cylinder lift drive system or a guide track lift system. The guide track system includes a knuckle transmission mounted above articulating linkage lift arms,

BRIEF DESCRIPTION OF THE DRAWINGS

Further objects and advantages of the present invention can be found in the detailed description of the preferred embodiments when taken in conjunction with the accompanying drawings which are briefly described below.

FIG. 1A diagrammatically illustrates a grapple truck with a side loader in accordance with the principles of the present invention.

FIG. 1C diagrammatically illustrates the J-shaped side loader.

FIGS. 2, 3 and 4 diagrammatically illustrate the operation of the side loader first empty, then manually loaded with debris (FIG. 3) and finally during an emptying operation placing debris in the truck box (FIG. 4).

FIGS. 9 and 11 respectively show a rearward guide track channel 282 and a forward guide track channel.

FIG. 11 diagrammatically illustrates a combination side loader and an adjacent bin carrier.

DETAILED DESCRIPTION OF THE PREFERRED EMBODIMENTS

Figure 1B:
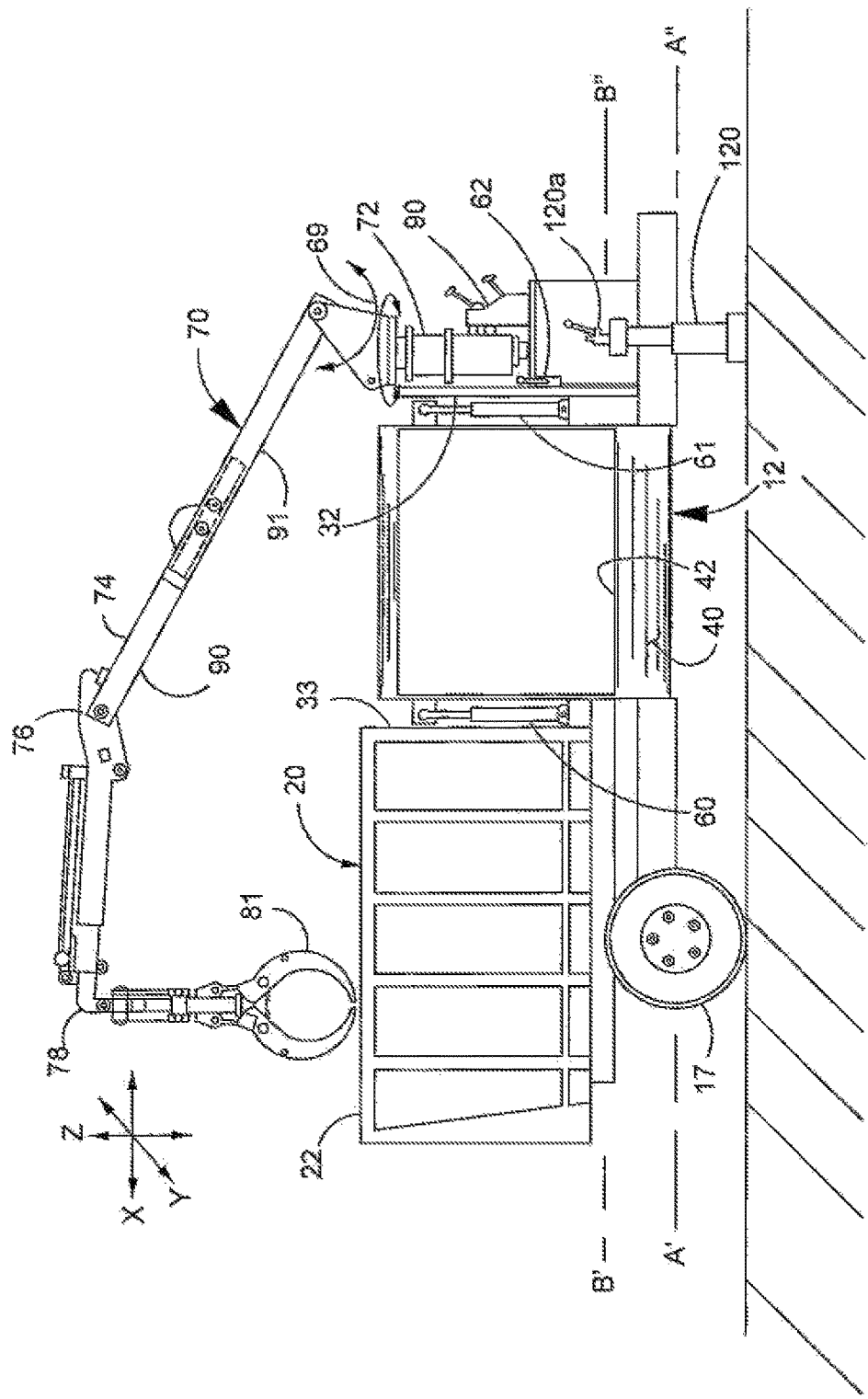
FIG. 1B diagrammatically illustrates key elements in the grapple truck and side loader (excluding the cab and truck engine compartment).

The present invention relates to a grapple truck with a side loader. Similar numerals designate similar items throughout the drawings. Several of the drawings are discussed concurrently herein. The terms the terms "inboard" and "outboard" refer respectively to items closer to or inboard to the longitudinal centerline of the grapple truck, that is, the longitudinal centerline through the open top truck bed container, and "forward" and "rearward" refer to items closer to or farther away from the cab of the truck. The term "aft" is similar to rearward. The term "lateral" refers to the position of an item perpendicular to the longitudinal centerline of the grapple truck. For example, laterally inboard is closer to the truck's longitudinal centerline as compared with other items which are laterally outboard or further away from the longitudinal centerline of the grapple truck.

FIG. 1A diagrammatically illustrates a grapple truck with a side loader in accordance with the principles of the present invention. Truck 10 has, along one of its sides, a side loader 12. Truck 10 is controlled by a driver in cab 14 and the truck is powered by an engine beneath the hood of cab 14. Truck 10 has at least front and rear wheels and these wheels along the passenger-side are identified as wheels 16, 17 in FIG. 1A. The side loader can be disposed on either side of the truck. The truck has an elongated chassis 18 (elongated longitudinally) which is supported by the wheels. Truck 10 has a truck bed open top box 20 which is movably mounted on chassis 18. For example, see FIG. 6. Truck box 20 has opposing sidewalls 22, 23, longitudinally extending over chassis 18.

Figure 5:
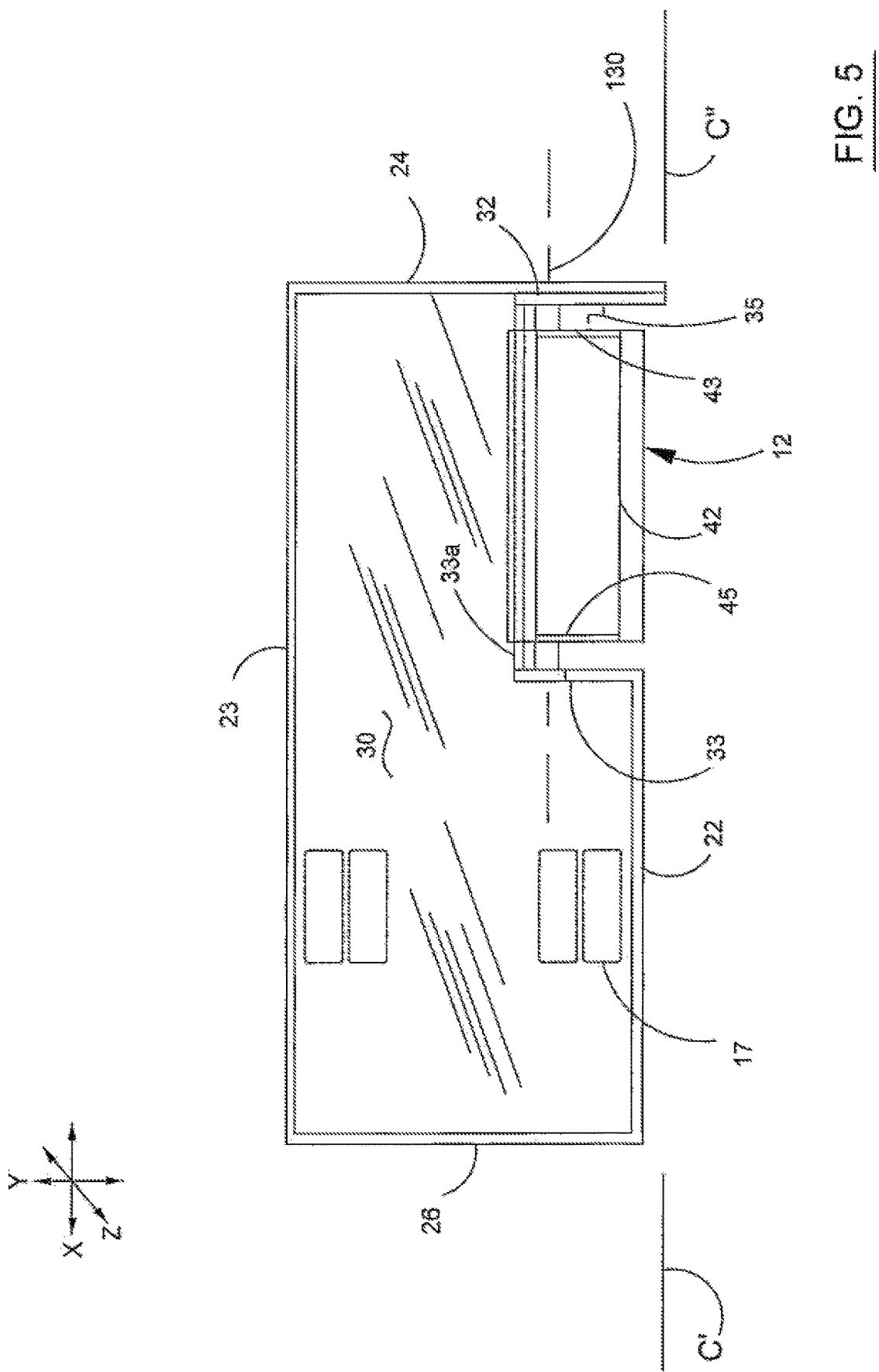
FIG. 5 diagrammatically illustrates a top plan view of the truck box, showing the truck bed bounded by opposing sidewalls, a forward wall, and a rear wall and showing the recess. The J-shaped scoop is pivotally mounted within the recess.

FIGS. 1A, 2 and 5 show the truck box elements. Top plan view of truck box 20 in FIG. 5 diagrammatically illustrates that truck box 20 has opposing bed sidewalls 22, 23, and a forward wall 24 behind cab 14. The forward wall 24 laterally extends across chassis 18 (FIG. 1A) as does rear wall 26 at the end of truck 10. See FIGS. 1A and 5. Truck box 20 has a box floor 30 shown in FIGS. 2 and 5. Box floor 30 is bounded by sidewalls 22, 23, forward wall 24 and rear wall 26.

A recess for the side loader is shown in various figures, specifically FIGS. 1A and 5. Truck sidewall 22 has a side recess 35 therein (graphically illustrated in FIG. 5) with opposing forward recess side wall 32 and aft recess side wall 33. Recess walls 32, 33 laterally extend into truck bed box 20 and the recess extends inboard into the truck box 20. The recess also is defined by a laterally inboard recess backwall 33a. In this manner, truck bed box floor 30 has a laterally narrow, forward region compared to the laterally wider rearward region. See FIG. 5.

The J-shape of the side loader is shown in FIGS. 1A, 1C, 5 and 8. Side loader 12 is pivotally mounted in recess 35 and this is graphically shown in FIG. 5 by the pivot or rotational axis 130 and graphically shown in FIG. 8. Side loader 12 has substantially a J-shaped 40 open top debris collection scoop wherein the upper leg of the J-shape is pivotally mounted at pivot 130 (FIG. 5, 8) and is mounted between the fore and aft recess walls 32, 33. The pivot 130 is best shown in FIG. 5. The J-shaped scoop 40 is opened to the side of the truck 10 and has a sideloading terminal edge 42 formed as part of the lower hook extremity of the J-shaped scoop. FIG. 1C shows the J-shape as double-headed hooked arrow 40 indicating the shape of the bottom of J-shape scoop 40. This J-shape scoop 40 has side panels 43, 45 diagrammatically illustrated in FIG. 1C. In some embodiments, the substantially J-shaped side loader is vertically and pivotally movable in and above the truck bed open top box recess. The side loader forms, at its lower extremity, a debris collection scoop. The side loader has an upper leg plate extending from the scoop to its upper extremity which upper extremity pivots with respect to the sidewall of the truck. The J-shape may be squared off rather than have a curved bottom surface, that is, an L-shape wherein the lower stem of the L-shape projects outboard from the recess and wherein the lower terminal end of the L-shape forms the loading edge for the side loader. A U-shape side loader is similar to the J-shaped side loader but with a truncated leg on one side of the U-shape.

FIGS. 1A and 1B show a terminal hook edge of the side loader. J-shaped scoop 40 has a terminal loading edge 42 which is substantially coextensive with an upper wheel line B'-B" in FIG. 1B formed by truck wheels 16, 17. Alternatively, loading edge 42 may be beneath the upper wheel line. The vertical position of the edge 42 permits manual loading of the side loader. The terminal edge 42 is at the hooked end of the J-shape and is a loading edge because a user, standing next to the grapple truck, carried debris over the terminal edge and into the hollow J-shape of scoop 40. In this manner, the user can manually load debris over the terminal edge since the edge is coextensive with or below the upper wheel line, that is, not too high for the user.

FIGS. 1A, 1B and 5 show the compact nature of the side loader. In order to provide a compact truck, having both a grapple tool and a side loader, terminal edge 42 is substantially planar and coextensive with sidewall 22 (that is, the sidewall plane). Stated otherwise, the J-shaped scoop and the terminal edge 42 do not laterally extend substantially beyond the plane established by the sidewall 22. This is graphically illustrated in FIG. 5 in that terminal edge 42 of J-shaped scoop 40 is in the same plane C'-C" as sidewall 22. Further, in order to provide a compact and highly portable grapple truck with side loader, the lower extremity 50 of J-shaped scoop 40 (diagrammatically illustrated in FIG. 1A) is either substantially coextensive with the longitudinal line A'-A" through respective rotational centerlines of front wheel 16 and rear wheel 17 or beneath the axle wheel line A'-A". The lower extremity or exterior wall surface 50 of J-shaped scoop 40 is also beneath the side wall 22. This permits manual loading of the side loader.

In order to raise and lower side loader 12, at least one hydraulic power lift, and preferably two hydraulic power lifts 60, 61, are mounted on side loader fore and aft 43, 45 while the other end of these power lifts is coupled to chassis 18. The lifts are controlled by a controller 62 shown in FIG. 1A. Lifts 60, 61 may be pneumatic lifts. The power lift system raises the side loader from a lower, loading position and thereafter pivots the side loader to an inverted upper dump position whereat the scoop discharges debris into the open top box. The power lift system for the side loader may be a channel-guided lifter with fore and aft candy-cane shaped channels (see FIGS. 9-11). The power lift system includes a controllable pneumatic or hydraulic drive cylinder first vertically lifting the side loader and then inverting the side loader to the dump position.

Figure 4:
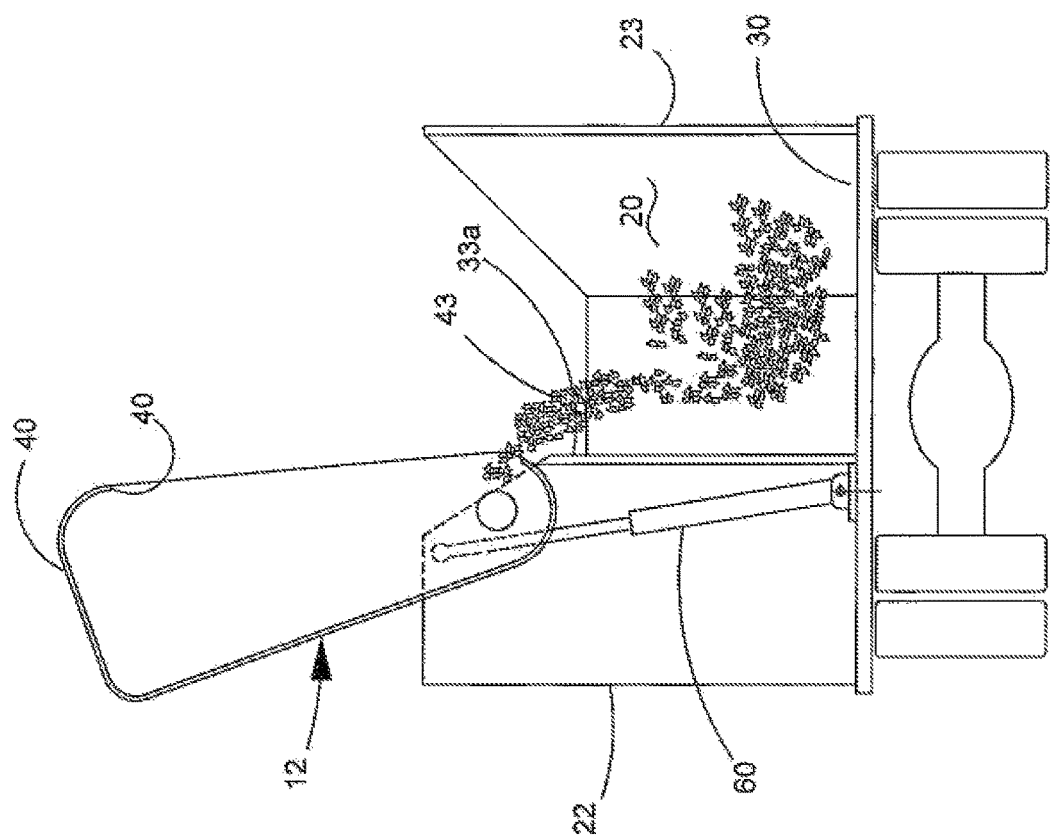

FIGS. 2-4 show operational aspects of the side loader. As shown in FIGS. 2 and 4, side loader 12 and particularly J-shaped scoop 40 is in a lower loading position (FIG. 2) permitting manual loading of debris therein. The J-shaped scoop 40 also has an upper disposal position (FIG. 4) wherein debris initially captured by scoop 40 is deposited into truck box 20. FIG. 3 shows scoop 40 in the process of being raised from the lower position in FIG. 2 to an upper position or debris disposal position in FIG. 4. The power lift system raises the side loader from a lower, loading position and thereafter pivots the side loader to an inverted upper dump position whereat the scoop discharges debris into the open top box.

The objective achieved by the present invention is a compact grapple truck with a side loader. The truck 10 has an articulated boom and a grapple tool or grappling mechanism at the terminal end of the boom arm as well as an easy accessible side loader permitting a user to manually fill the side loader with debris and thereafter use the grapple tool at the end of the articulated boom to lift large debris and place that large debris in the truck box. Hence, the location of the side loader, the compact nature of the side loader, the low slung aspect of the side loader for manual filling, and the all-purpose grapple boom achieves the present objective of providing a compact grapple truck. Additionally, it is important to lower the articulated boom to a lower position and store the grapple tool at the end of the articulated boom arm (the grapple jaw) in the truck bed.

In this manner, the grapple truck with the side loader not only is compact laterally to go through residential streets but also is compact in height to avoid unnecessary interference with trees and other overhead items on residential streets.

Figure 7:
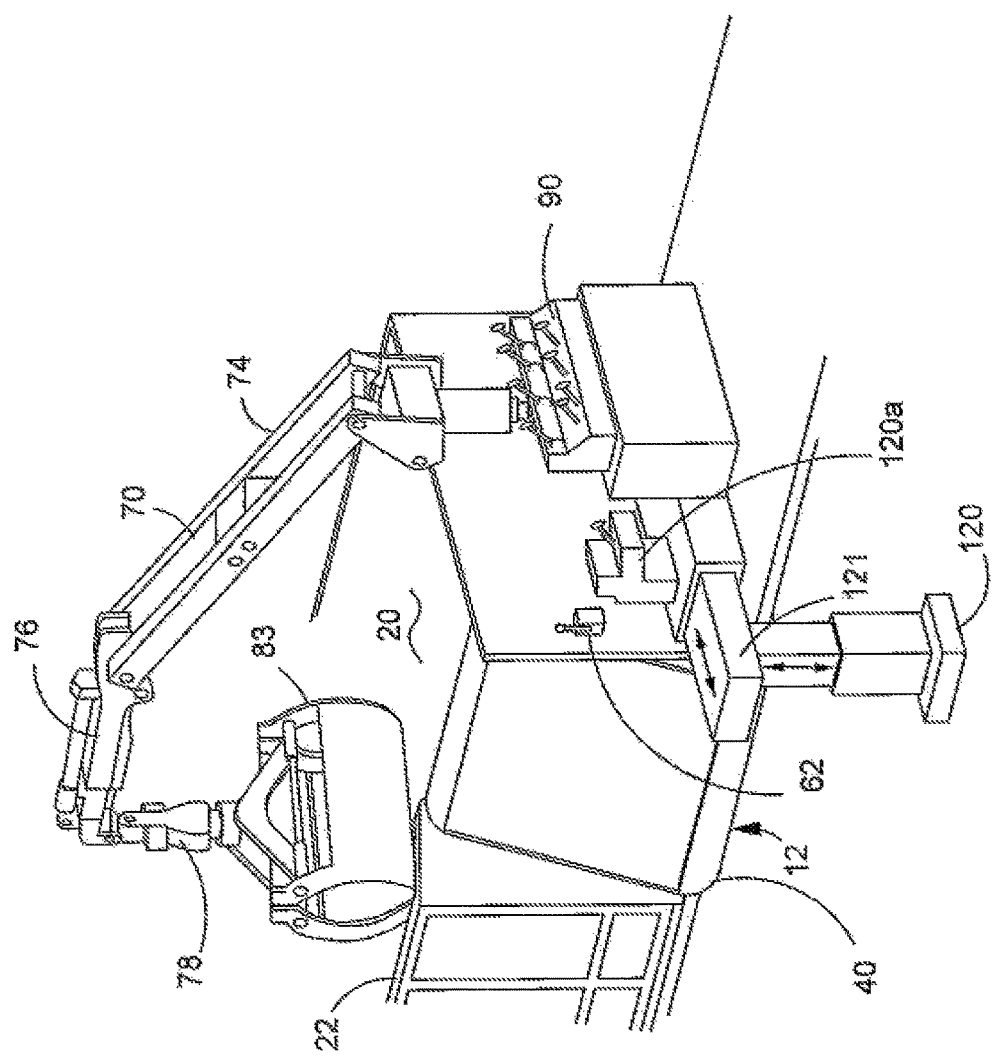
FIG. 7 diagrammatically illustrates the controls for the articulating arm in room as well as the J-shaped scoop and an articulating boom and arm system.

In several figures, such as FIGS. 1A, 1B and FIG. 7, the articulated boom 70 has a support base 72 which is mounted on chassis 18. The elongated articulated boom arm comprises several arm segments illustrated herein as arm segments 74, 76, 78. Articulated boom is swivel mounted on support base 72. See double headed arrow C, numeral 69, in FIG. 1B. The articulated arm has at least degrees of motion as shown by the coordinate axis X, Y, Z in FIGS. 1B and 5.

Further, the articulated boom arm permits longitudinal arm extension graphically illustrated by extendable arm segments 90 and 91 in FIG. 1B. The drawings herein illustrate several grapple articulated booms. Different booms may be used as long as those booms meet the compact storage and operational aspects for the booms described herein.

The grapple jaw or tool is shown in FIGS. 1A, 1B, 7 and 8. Articulated boom 74, 76, 78 and boom arm terminate in a grapple jaw, sometimes called herein a grapple tool. This grapple jaw can have several different configurations as shown by tool 80, 81, 83 and 85 in FIGS. 1A, 1B, 7 and 8. This grapple jaw or tool has a closed position shown in FIGS. 1A and 1s adopted to be maneuvered and opened to capture debris in its jaw. The grapple jaw tool as an open position 84 diagrammatically shown in FIG. 8. In the open position, the grapple jaw is adapted to release debris into truck bed and truck box 20. The articulated boom and articulated arm have a stored position with a foreshortened longitudinal arm span wherein the grapple jaw rests atop the truck box floor and the articulated boom and articulated arm are longitudinally and laterally within the open top box.

The articulated boom 70 has a boom power and control 90 which operates the articulated boom 70, the boom arms 74, 76 and 78 and the grapple jaw tool 80, 81, 83 and 85. The boom power and control 90 moves the grapple jaw and arm segments over the truck bed 30, over the truck box 20, beyond the rear wall 26, and also under controls the boom and grapple tool to be positioned laterally over sidewalls 22, 23. The boom control 90 is mounted on chassis 18.

Figure 8:
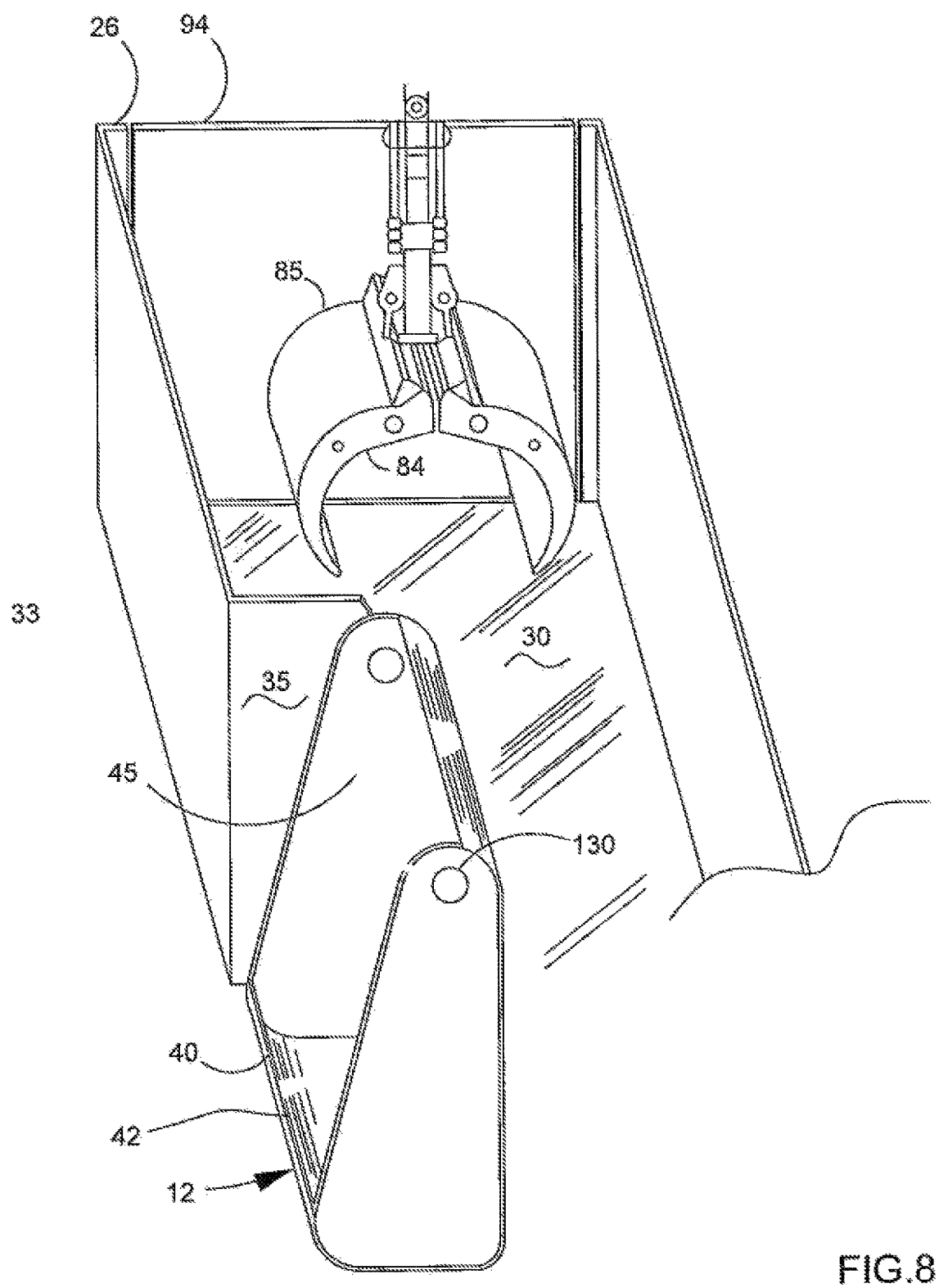
FIG. 8 diagrammatically illustrates a resting position or storage position of the grapple tool on the truck bed.

The articulated boom 70 and boom arm 80, 81 has a stored position shown in FIG. 8. In the stored position, the longitudinal arm span is foreshortened. In a stored position, the longitudinal span of boom 70 is shortened (by inserting arm segment 90 and two enlarged arm segment 91 as graphically illustrated in FIG. 1B) wherein the grapple jaw 85, shown in FIG. 8, rests atop the box floor 30. In this stored position, substantially all of the articulated arm is longitudinally spaced apart and disposed above box floor 30 as diagrammatically illustrated in FIG. 8. In operation, the articulated boom 70 and its constituent elements, are adopted to extend the grapple tool jaw 80, 81, 83, 85 over the truck bed 30, over the truck box 20, beyond the rear wall 26, and also under control, laterally over and beyond sidewalls 22, 23.

Figure 6:
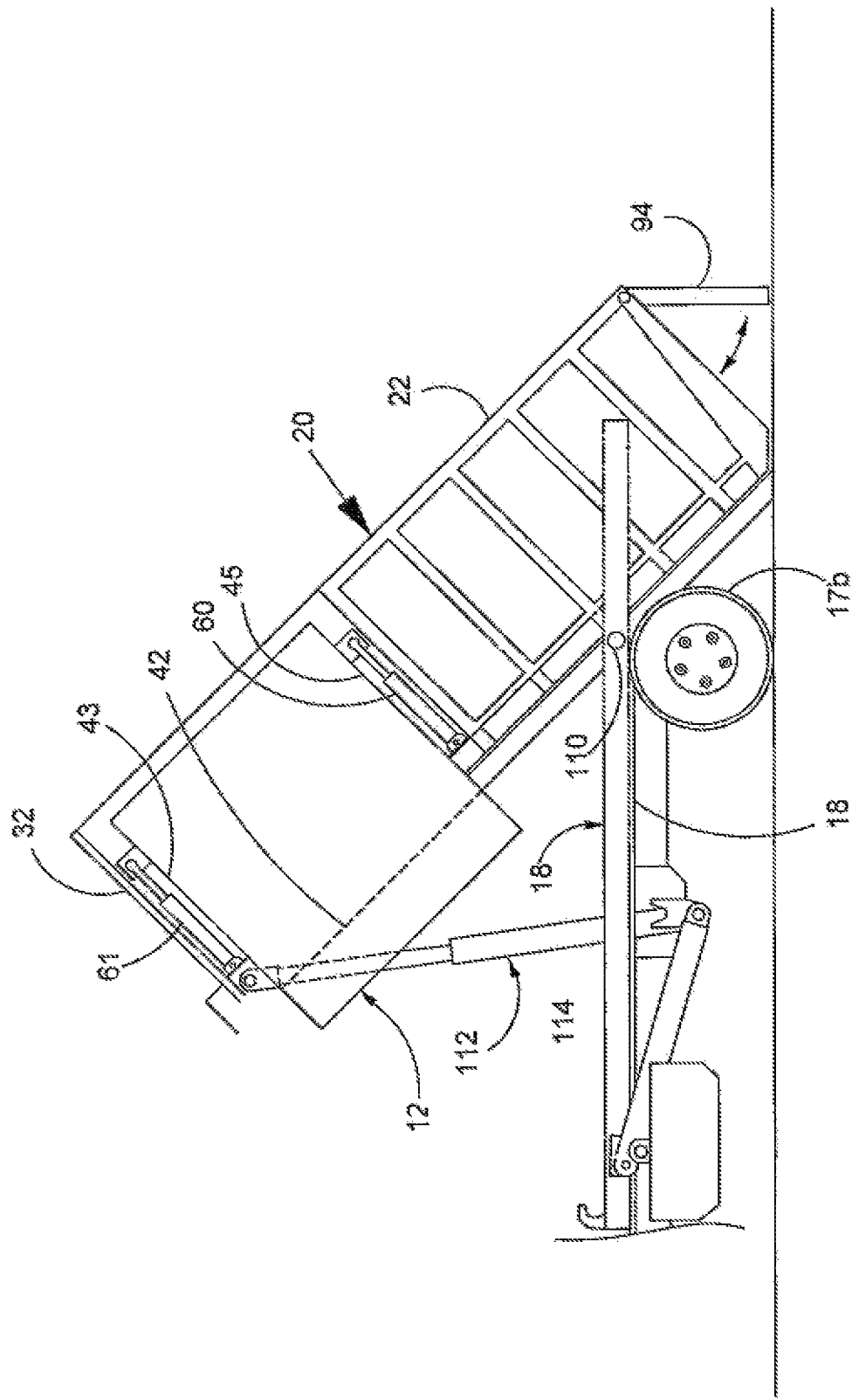
FIG. 6 diagrammatically illustrates one mechanism to empty the truck box.

In order to empty the truck box 20 of debris, as shown in FIG. 6, the truck bed is pivotally mounted at pivot point 110 of the chassis 18. This pivot point 110 is rearward a bed lifter system 112. The bed lifter 112 is mounted between chassis 18 and the truck bed 20 at a forward position 114 of the truck bed such that dump door 94, configured as part of rear wall 26, is opened when the bed lifter raises the bed 20.

Prior to lifting truck bed 20, the articulated boom and arm is moved laterally away from bed 20. Other methods and systems may be employed to empty bed 20. As shown in FIG. 1A, boom control 90 is disposed intermediate cab 14 and truck bed 20.

In order to further stabilize the grapple truck during boom operation, a pair of stabilizing standards 120 are located on each side of the chassis 18, generally near boom control 90. Each motorized stabilizing standard includes a laterally outboard extending element and a vertical extension providing ground stabilization under vertical controlled power. The standards 120 are laterally extended by lateral extension bars or systems under the control of controller 120a (FIGS. 1A and 1B). Movable lateral extensions 121 are shown in FIG. 7. The standards are both laterally extendable and the terminal elements of the standards are vertically extendable to the ground level (see FIG. 7). Controller 120a also powers the vertical extension of standards 120. When laterally extended and vertically set onto the ground (partly lifting or supporting the grapple truck up), stabilizing standards 120 are placed on the ground and laterally stabilize the truck. When deployed, these lateral extensions for the standards extend beyond the terminal edge 42 of the respective truck sidewalls 22, 23. Rather than have y and z axis movement, stabilizing standards 120 may each have an angled stabilizing standard structure (about 45 degrees when deployed on the ground) and be hydraulically or pneumatically lowered, raised or laterally positioned.

Figure 9:
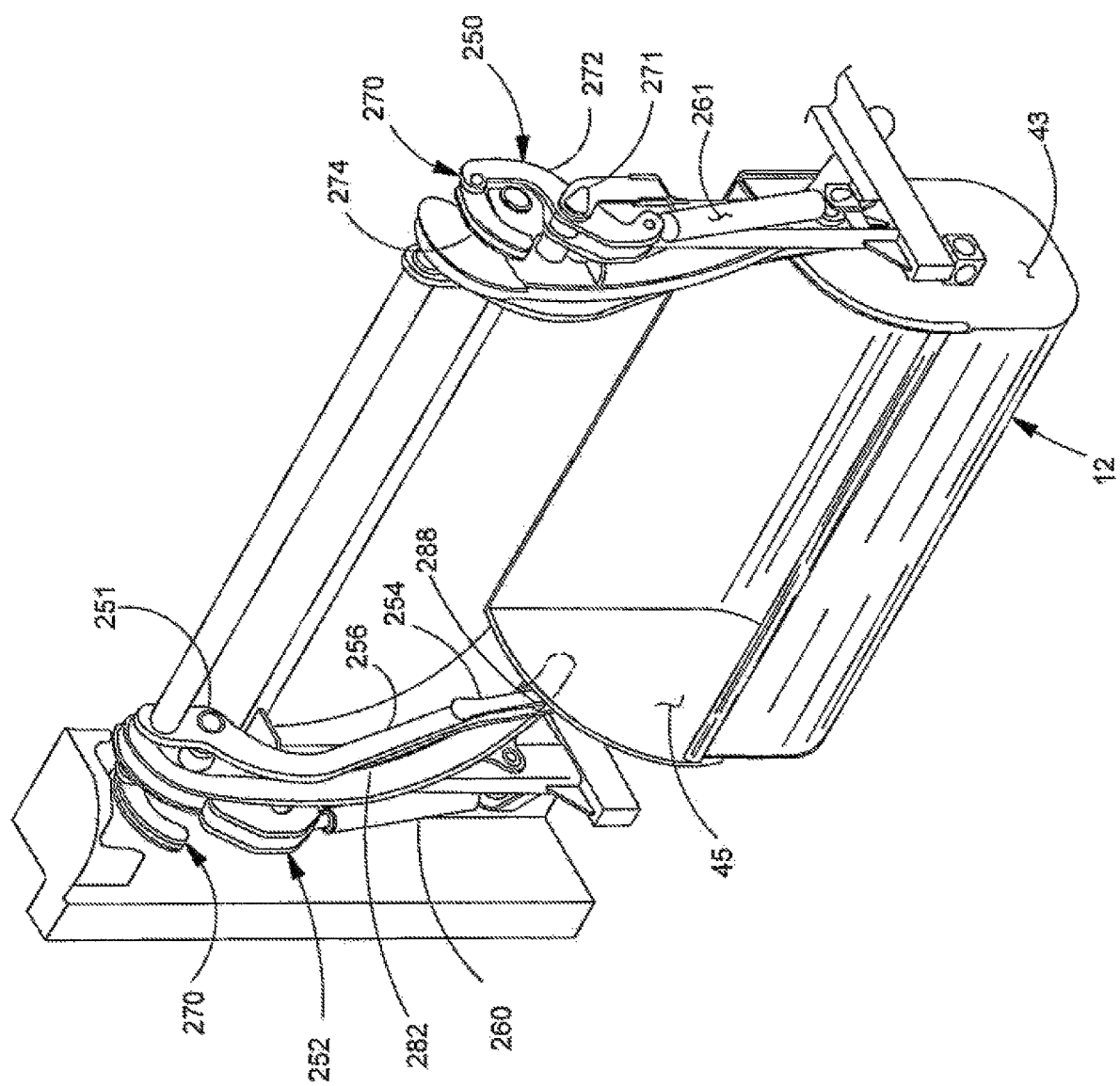
FIG. 9 shows a different lifter system for the side loader as compared to FIGS. 1A-4.
Figure 10:
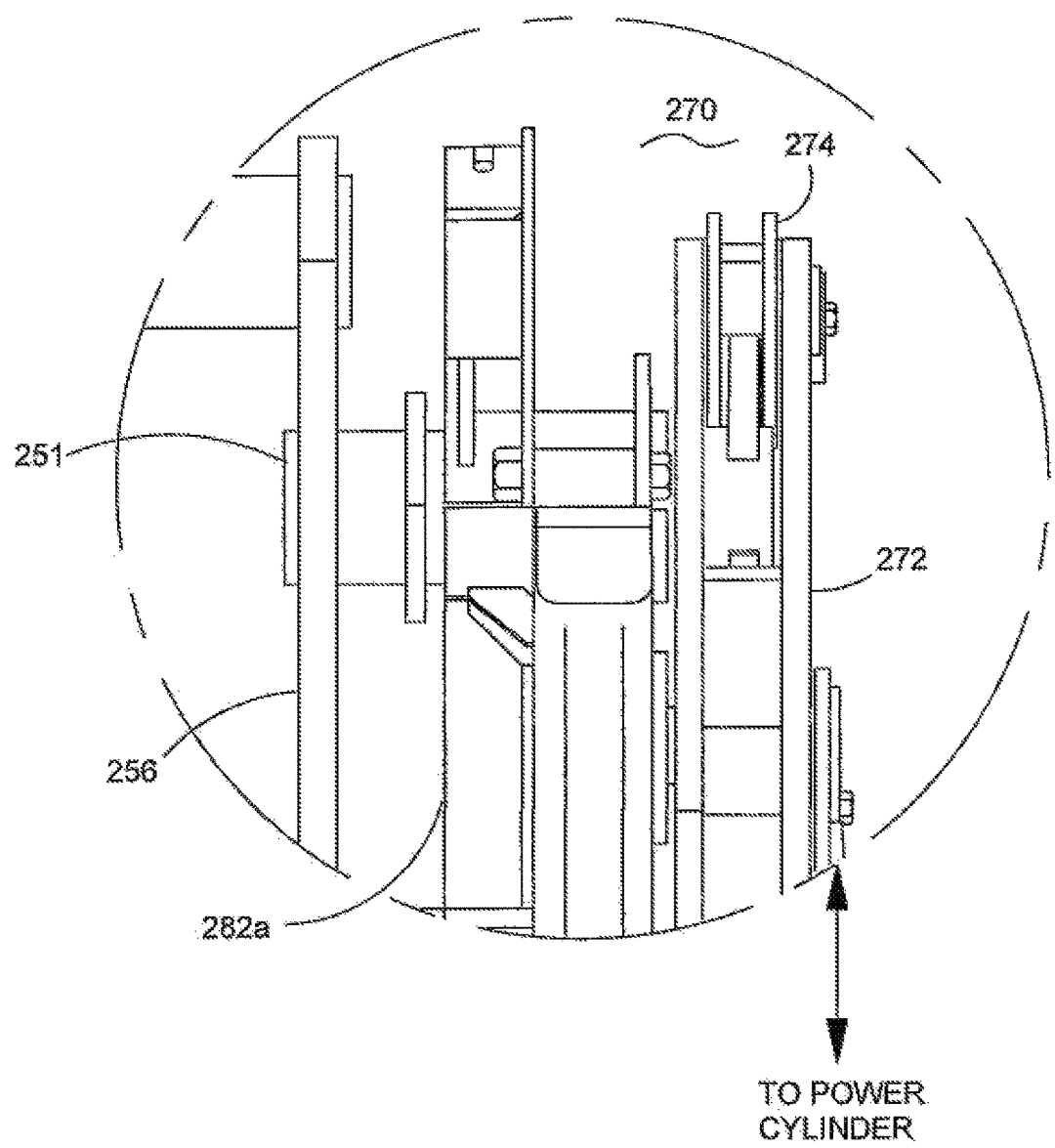
FIG. 10 shows a knuckle transmission which supplies rotational power to the inboard drive axis connected to the upper region of dog bone lifter link shown in FIGS. 9 and 11.
Figure 11:
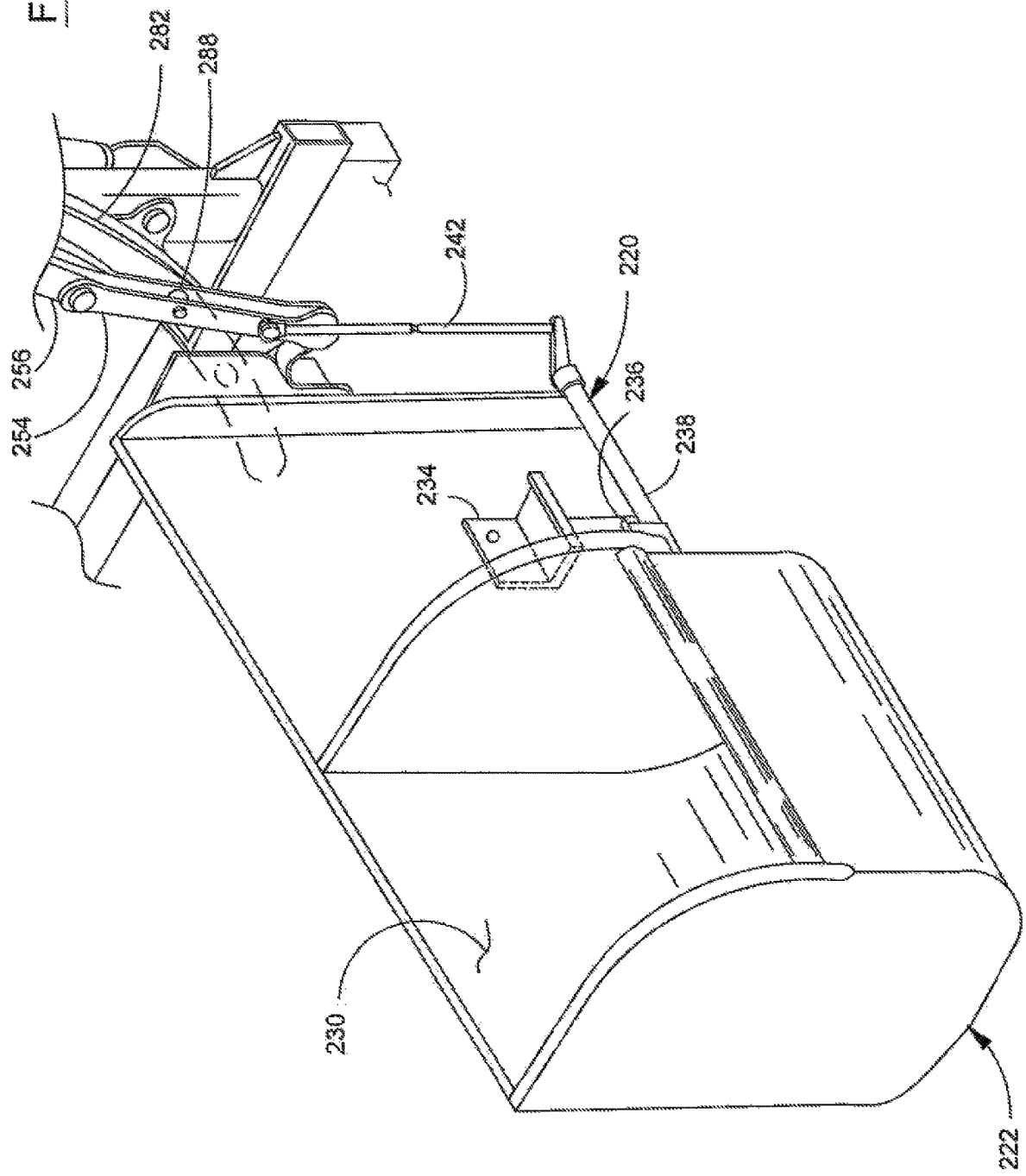

FIG. 9 shows a different lifter system for side loader 12 as compared to FIGS. 1A-4. In FIG. 1, forward and rearward lift systems are powered by pneumatic or hydraulic cylinder systems 61, 60 (FIG. 1B). In FIGS. 9-11, the lift systems include pneumatic or hydraulic cylinder systems 261 (forward), 260 (rearward). It should be noted that the lift systems in FIGS. 1A-4 and FIGS. 9-11 are generally interchangeable. In FIGS. 9-11, the structure of the forward lift arm set 250 and the rearward lift arm set 252 is substantially identical. The forward arm set 250 is a powered by lift cylinder 261 and rearward arm set 252 is powered by cylinder 260. Stated otherwise, the forward arm set 250 provides motive power to raise and lower the side loader 12 along the side of grapple truck 10. The substantially J-shaped side loader is vertically and pivotally movable in and above the truck bed open top box recess. The side loader forms, at its lower extremity, a debris collection scoop. The side loader has an upper leg plate extending from the scoop to its upper extremity which upper extremity pivots with respect to the sidewall of the truck. The J-shape may be squared off rather than have a curved bottom surface. The power lift system for the side loader is in this embodiment a channel-guided lifter with fore and aft candy-cane shaped channels. The power lift system includes a controllable pneumatic or hydraulic drive cylinder first vertically lifting the side loader and then inverting the side loader to the dump position.

The power lift system for the side loader is either a channel-guided lifter (FIG. 9) or a direct lift and pivot system (FIG. 1A) or an electric motor drive. The electric motor mounted on the chassis with cables or chain drive to power lift the side loader. The power lift system for the side loader is either a direct lift and pivot system or a channel guides lift. The direct lift and pivot system includes one or more hydraulic or pneumatic power lifts to pivotally raise the J-shaped side loader from a lowered position permitting manual loading of debris and an upper inverted dump position whereat the J-shaped side loader is adapted to displace debris from the J-shaped scoop into the truck's open top box. The power lift system in FIG. 9 includes articulated power linkages 272, 274, 254, 256 between the drive cylinder and the side loader. Although two drive cylinders are used in FIG. 9, a single drive cylinder may be used. With a single driver, the opposite articulated linkages 272, 274, 254, 256 (opposite the single drive cylinder) are stabilizing linkages. The knuckle transmission is intermediate articulated linkages 272, 274, 254, 256.

It should be noted that in some systems, only a single lift cylinder may be used rather than the dual cylinder systems 260, 261 shown in FIG. 9. In a single power lift system, the rearward stabilization arm set 252 only stabilizes the side loader 12 as the side loader moves up and down the side of grapple truck 10. The source of motive power to move the side loader can be relocated to the rearward and forward system 250 acts as a stabilization system.

Since the forward and rearward lift systems in FIGS. 9-10 show substantially the same lifters, similar numerals identify similar lifter system parts and functions. Arm sets 250,252 include a lower lifter link 254 and an upper dog bone lifter link 256 (an articulating motive arm rotatably coupled to the lower link). The upper region of the upper lifter link or arm 256 is rotatably mounted with respect to the respective truck bed walls and recess side walls at the inboard ends 251 of the rearward and forward transmission systems. The rearward transmission system is shown in FIG. 10, as viewed from the truck bed 30 looking outboard of the bed. Dog bone link 256 is effectively driven by power cylinder 260. Effectively as known in the art, pneumatic or hydraulic cylinders 260, 261 have extendable actuator arms which are coupled to a knuckle transmission 270 shown in FIG. 10. The knuckle transmission 270 provides rotational power to rotate the upper region of dog bone link 256 which rotates about the inboard transmission output axis at 251. Motive power is then supplied from the transmission 270 to the dog bone link 256 and to the lower lifter link 254 for powered arm set 252. Powered arm set 252 lifts the side loader and thereafter lowers the empty side loader.

The pneumatic or hydraulic cylinders 260, 262 are controlled by controller 62 shown in FIG. 1A. An electric motor may replace the power cylinders. The power cylinders 260, 261 are a controllable source of motive power. If a motor is used, the motor could apply rotational force directly to the upper region of dog bone link 256 or provide rotational force through a transmission to rotate and pivot link 256 and lift the side loader 12. The grapple truck includes a controllable source of motive power (a pneumatic, hydraulic or electric power lift) to move a single side loader or the combinatory side loader and bin carrier up and down and over the side wall of the open top truck bed container. Various types of linkages and drive systems may be used with these source of motive power (a pneumatic, hydraulic or electric power lift systems).

As indicated earlier, the side loader 12 is moveably disposed in side recess 35 (FIG. 5) defined by recess sidewalls 33, 32 and recess back or rear wall 33a. Recess rear wall 33a is laterally located at an inboard position in truck bed 30. See FIG. 5. Once debris is manually loaded into side loader 12 curbside of truck 10, the side loader is lifted either by the direct cylinder power of FIGS. 1A-4 or the track-guided system of FIGS. 9-12. The deposit of debris by the side loader into the forward region of the truck bed 30 permits the truck operator to use the articulated grapple system 74,70,78,80 to grab, lift and deposit large or heavy debris into bed 30. These are some of the several important features of the present invention because the grapple system can be positioned in the stable, rest position while the side loader 12 loads debris into the truck bed 30.

As for FIG. 11 and the combination side loader and bin carrier 220, the grapple truck jaws 80 can grab debris not in the consumer-loaded debris or trash bins and pick up that free debris (debris alongside the street and not in the consumer or commercial trash bins) and place that free debris in the truck bed 30. In this manner for this embodiment, the present invention is a triple-use debris pick up system (see manually loaded side loader 222, trash bin carrier/lifter 220 and the grapple jaw pickup for free, non-containerized debris). The grapple jaws pick up one class of debris. The bin carrier 220 has hooks 234, 236 to pick up trash filled bins and small free trash can be manually placed within side loader 222 and then debris from both the bin and the side loader can be dumped in the truck bed. Of course, bin carrier 220 can separately lift a trash filled bin and deposit debris into truck bed 30 independent of the use of side loader 222.

Another of the many important features of the present invention is that municipalities can customize grapple truck 10. The customization involves a full-length side loader (FIG. 1A), two side-by-side bin carrier-lifter systems (FIG. 11 wherein side loader 222 is replaced by a rearward located, second bin carrier similar to forward bin carrier 220), and a half-length side loader 222 and an adjacent bin carrier 220 (FIG. 11). Also, the power lift system may be selectable.

FIGS. 9-10 show knuckle transmission 270 supplies rotational power to the inboard drive axis connected to the upper region of done bone lifter link 256. FIGS. 9 and 11 show a guide track channel 282 (FIG. 9 shows the rearward guide track channel 282 and FIG. 11 shows the forward guide track channel 282). FIGS. 9 and 11 show that the forward and rearward lower lifter link 254 has a cam follower roller 288 (rotatably mounted on the link) that moves in the guide track channel 282.

FIGS. 9 and 10 diagrammatically illustrate power linkages and knuckle transmission 270. The rotational transmission output is supplied to the lift system at forward and rearward drive axles 251. These axle outputs rotate and cause done bone link 256 to rotate about axle outputs 251. The pneumatic or hydraulic power cylinders 260, 261 have an extendable actuation arms (not shown) which generally move upward during a lift cycle and downward during a return cycle. Knuckle transmission system 270 is fixed to the truck. The knuckle transmission 270 has a shallow S-shaped link arm 272 which articulating arm rotates and delivers power to a second articulating power leg or link 274 that rotates about axis 251 upon the upward movement of the powered extendable actuation arm of power cylinder 261, 260. The center-point 271 of the S-link 272 is rotatably mounted to the truck. The second articulated power leg 274 is rotatably mounted at one end to the upper region of the S-link 272 and is rotatably mounted at its other end to the power driver sleeve (not shown). This driver sleeve defines the transmission power output at inboard axle output 251 (the term "inboard" in connection with the transmission output is a position facing inward or inside the sidewall recess 35 (FIG. 5)). An upper region of the channel guide track 282 is secured to the truck by a coupler sleeve (not shown) within which the driver sleeve moves. The driver sleeve defines the transmission power output 251. The drive sleeve rotates within the coupler sleeve. Since FIG. 10 is an outboard view of the knuckle transmission from a truck bed inboard position, the backside 282a of guide track channel 282 is shown.

FIGS. 9 and 11 diagrammatically show the track channel 282 (rearward guide channel 282 in FIG. 9 and forward guide channel 282 in FIG. 11) within which moves the cam follower roller 288. The roller 288 is moveably mounted to the lower region of lower link lifter 254. The forward and rearward track channels 282 are substantially identical and are candy-cane shaped or shallow S-shaped channels (the vertical aspects of the channels are candy-cane shaped or S-shaped). The channel openings are U-shaped or are formed by squared-off walls. Both forward and rearward power arm sets include rotational couplers and rollers which operate to lift the side loader and establish a guided upward movement to a dump position due to the shape of guide track channels 282. The vertical terminal regions of the channels are partly arcuate to flip the loader or bin over and dump debris into the truck bed. The guide channel 282 is mounted to truck bed or bed container sidewalls.

Rollers 288 may be movably coupled to a load bearing plate system (not shown) on the forward side 43 and the rearward side 45 of the side loader. The load bearing plate system attached to the fore and aft sidewalls of the side loader may cooperate with an upper and a lower set of cam follower rollers (both encompassed by the function of roller 288) which are rotatably attached to the lower lifter link 254. Both upper and lower cam follower rollers 288 move within channel 282. The load bearing plate system maintains the vertical position of the side loader 12 as the side loader is first moved vertically upward and then is rotated due the upper candy-cane or S-shape curve of the guide track 282. The load bearing plate may be attached to the loader sidewalls or to the back plate 230 of the side loader (FIG. 11) or the back plate forming the shallow J-shaped scoop of side loader 12 in FIGS. 1A and 9.

The load bearing plate system is attached to the uppermost edge regions of common back plate 230 (the back plate forming the shallow J-shaped scoop) or the sidewalls. Grease fittings may be incorporated into all rotational elements of the system. The load bearing plate transmits load and load forces between lifter linkages 254, 256 and carrier back plate 230 or loader sidewalls. The load bearing plate may include spatial set-offs for the cam follower roller or rollers and may provide greater stability and force carrying structures for the side loader. With an upper and lower cam follower roller system, the lower terminal end of lower lifter link 254 may be rotatably attached to forward and rearward plates which bracket the guide track 282 (the rearward plate being adjacent the outboard side of the guide track 282 and the forward plate being adjacent the inboard side of the track). The dual rollers or the single roller pivots about a through bolt or small axle which is rotatable mounted on the forward and rearward plates. The roller or rollers rotate about this small axle.

As shown in FIG. 11, the common back plate 30 carries both the side loader 222 as well as any consumer-loaded or commercially-loaded, removably mounted bin on trash bin hook system 234, 236. In FIG. 9, the sidewalls 45, 43 carry and lift the side loader. All forces to lift and lower the side loader (FIG. 9) and the combination side loader and bin carrier (FIG. 11) can be carried by the load-bearing plate system described above. In a two-roller system, the upper and lower rollers move within channel 282 to smoothly raise and lower the side loader separately (FIG. 9) of the combination loader and bin carrier (FIG. 11). All motive power is transferred to the side loader and the bin carrier 220 via the two rollers and, if employed, the load bearing plate system. If a single power cylinder is used (FIGS. 1A and 9 show dual power cylinders), the non-powered linage sub-system is nearly identical to the powered system but the non-powered sub-system is only a stabilization system. The non-powered system omits the cylinders and the knuckle transmission 270 (primarily omits S-link 272 and upper supplemental link 274).

FIG. 11 diagrammatically illustrates a side loader 222 and an adjacent bin carrier 220. The half-size side loader 222 and bin carrier 220 is movably mounted on grapple truck 10 in a manner described in either FIGS. 1A-4 or as described in FIGS. 9-10. Stated otherwise, once side loader 222 is loaded, the debris can be lifted up and deposited into the truck bed either with the power lift system of FIGS. 1A-4 or FIGS. 9-10. In a like manner as described later, once a bin is attached to the upper bin hook 234, the combination side loader-bin carrier can raise the bin and deposit the bin's contents into the truck bed 30. In FIG. 11, the side loader 222 is partly formed by common back plate 230 which backplate provides support to bin hook 234.

FIG. 11 shows a hook and grab configuration for trash bin carrier 220. The design of this trash bin carrier 220 is known to persons of ordinary skill in the art. Trash bin carrier 220 has and upper bin hook 234 with an upwardly facing terminal hook edge. Trash bin carrier 220 also includes a rotatable lower bin depending hook 236. The upper bin hook 234 catches a complementary hook surface on a trash bin (not shown) whereas the lower bin depending hook 236 catches a lower complementary hook surface on the trash bin. As in known bin carrier systems, the lower bin depending hook 236 is rotated by bin rotator arm 238. The bin rotator arm 238 rotates in a lower bin sleeve. The lower hook rotator arm 238 is rotated by the movement of power arm 242. The upper end of the power arm 242 is rotatably mounted to either the dog bone link or the lower lifter link. As the bn carrier is raised, the lower hook 236 grabs a complementary hooking surface on the trash bin.

Although partial side loader 222 combined with the bin carrier 220 is shown as having a single trough next to a bin carrier 220, back plate 230 may have two side-by-side bin carriers 220 on the back plate 230.

Figure 12:
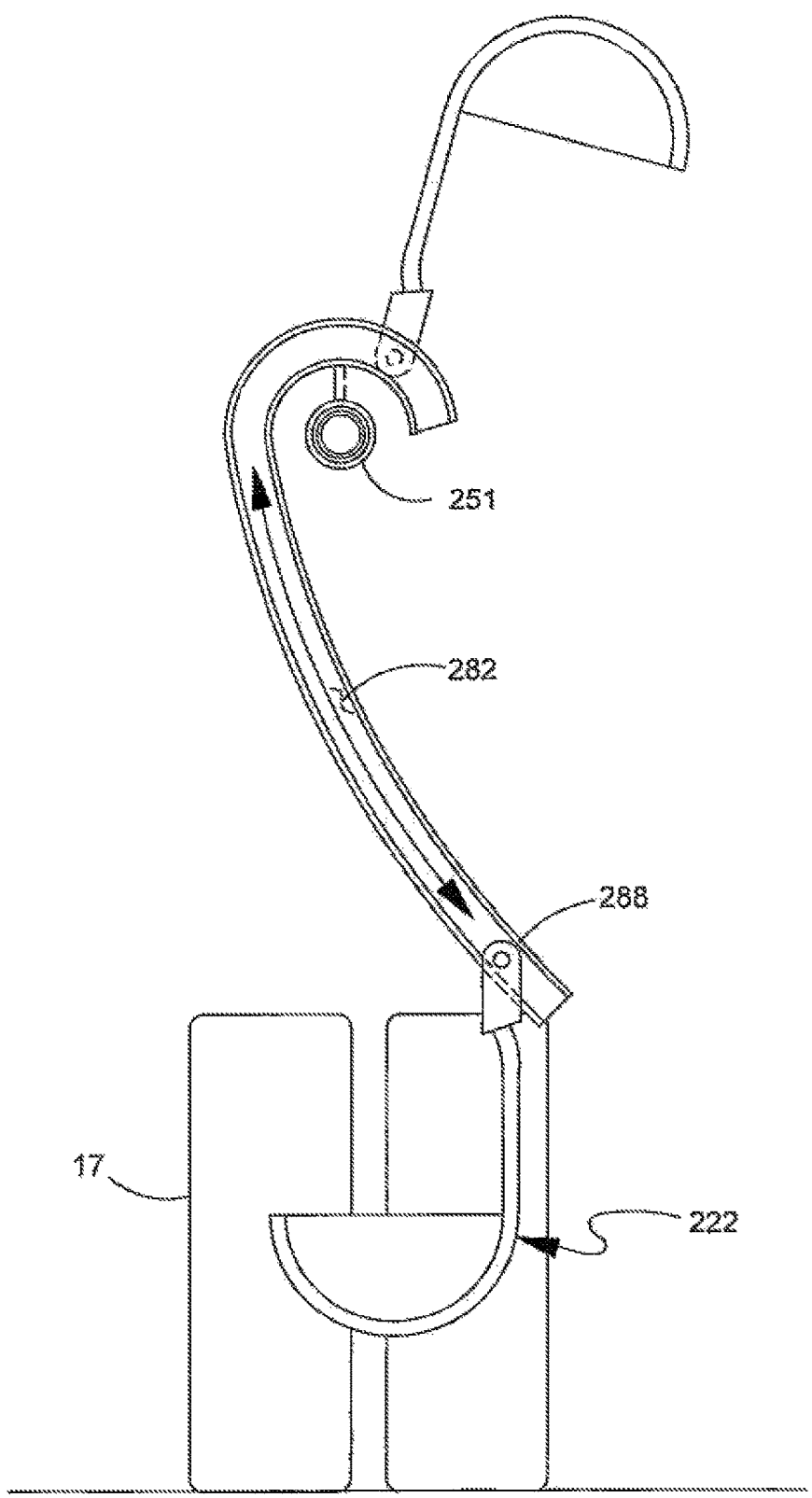
FIG. 12 diagrammatically illustrates the operation of either the side loader in FIG. 9 or the combination side loader and bin carrier in FIG. 11.

FIG. 12 diagrammatically illustrates the operation of either the side loader 12 in FIG. 9 or the combination side loader 222 and bin carrier 220 in FIG. 11. As explained earlier, both lift systems use a candy-cane shaped guide track 282. Side loader 222 in FIG. 12 is shown in its lowermost position which is either generally inboard of the laterally sidewall 22 of truck 10 or co-extensive with the plane defined by truck sidewall 22. This configuration assures that the side loader carrying grapple truck is compact and the tires protect the laterally extending loader 222. Cam follower roller or rollers 288 move within guide channel 282. The lower section of guide channel 282 is substantially straight although slightly angled outboard at an acute angle with respect to the vertical plane defined by truck sidewall 22. The upper portion of guide channel 282 is looped over the plane defined by truck bed sidewall 282 and over the upper edge of the recess rear wall 33a (FIG. 5, recess backwall 33a) such that in the uppermost dump position, the side loader 222 is upended to drop any trash or debris into the open top truck bed 30. In FIG. 12, the power delivering articulating arm system 256, 254 is not shown.

The benefits of the present invention over the prior art include: use of a grapple truck with a side loader (with and without an adjacent bin carrier), clearance of the up-ended side loader and bin carrier into the open top of the truck bed container, and a completely open top truck bed container thereby permitting the grapple arm system to gather as much or as little debris into the open top truck bed container. With the system, the side loader can be loaded with debris manually due to its low-slung position with respect to the adjacent roadway, bin can be picked up, and in both situations, the grapple can be used to grab and place large or heavy debris in the truck bed. Hence, multiple loading and dumping operations are achieved with the inventions.

If a load bearing plate system is used, it is interposed at the uppermost forward and rearward portions or sections of common back plate 30 or back side of the side loader or the sidewalls of the loader. The load bearing plate system is disposed between side loader and the combination loader and bin carrier and the guide track channel. In the lowest bin carrier position, the guide channel 282 and the upper and lower rollers of the bearing plate system are nearly vertical and nearly parallel with the then-vertically positioned side loader 220. The load bearing plate system is rotatably attached to the lower lifter link 254 which arms pulls the side loader 220 upward.

The claims appended hereto are meant to cover modifications and changes within the scope and spirit of the present invention.

The invention claimed is:

1. A grapple truck with a side loader comprising:
a truck, powered and controlled by a cab and an engine, the truck having least front and rear wheels, an elongated truck chassis coupled to said wheels and a truck bed open top box movably mounted on said chassis, said truck box having opposing bed sidewalls longitudinally extending over said chassis, a forward wall behind said cab laterally extending across said chassis, and a rear wall at the end of the truck, said truck box having a box floor bounded by said sidewalls and said forward and rear walls;
one sidewall of said opposing sidewalls having, at a forward location, a side recess extending inboard into said truck box with opposing fore and aft laterally extending recess walls and an inboard backwall;
a side loader pivotally mounted in said recess, said side loader having a substantially J-shaped open top debris collection scoop wherein an upper leg of said J-shaped scoop is pivotally mounted with respect to said one sidewall;
said J-shaped scoop open to the side of said truck and having a side loading terminal edge formed by said J-shaped scoop which terminal edge is either substantially coextensive with or below an upper wheel line of said truck wheels, thereby adapted to permit a manual loading of debris into said J-shaped scoop over said terminal edge, and said terminal edge not extending substantially outboard a plane defined by said one sidewall;
one or more hydraulic power lifts to pivotally raise said J-shaped scoop from a lowered position permitting said manual loading of debris and an upper dump position whereat said J-shaped scoop is adapted to displace debris from said J-shaped scoop into said truck box;
an articulated boom having a support base mounted on said chassis, an elongated articulated arm swivel mounted on said support base, said articulated arm having at least three degrees of motion including a longitudinal arm extension, said articulated boom and arm terminating in a grapple jaw, said grapple jaw having a closed position adapted to capture debris in its jaw and having an open position adapted to release debris into said open top box of said truck bed;
a boom power and control operative with said articulated boom, arm and grapple jaw and adapted to raise and lower and extend said grapple jaw over and beyond said open top box, said boom control mounted on said chassis;
said articulated boom and arm having a stored position with a foreshortened longitudinal arm span and wherein said grapple jaw rests atop said box floor and substantially all of said articulated arm is longitudinally disposed above and longitudinally and laterally within said open top box, and said articulated boom and arm having multiple operative positions wherein said arm is adapted to extend said grapple jaw over and beyond said open top box.

2. The grapple truck as claimed in claim 1 wherein said rear wall has a dump door adapted to permit emptying debris from said truck box and said truck bed is pivotally mounted on said chassis at a rearward pivot position, and including a bed lifter mounted between said chassis and said truck bed at a forward position of said truck bed such that said dump door is opened when said bed lifter raises said bed.

3. The grapple truck as claimed in claim 1 wherein said boom control is disposed intermediate said cab and said truck bed.

4. The grapple truck as claimed in claim 1 including a pair of stabilizing standards, one standard for each side of said truck, each stabilizing standard laterally extending away from said chassis beyond said terminal edge and the respective sidewall.

5. The grapple truck as claimed in claim 1 wherein a lower extremity of said J-shaped scoop is either substantially coextensive with or below a longitudinal line through respective rotational centerlines of the rear truck wheel beneath said one sidewall and the corresponding front truck wheel.

6. The grapple truck as claimed in claim 1 including a pair of motorized stabilizing standards, one standard for each side of said truck, each stabilizing standard laterally extending outboard said chassis and a respective sidewall under lateral controlled power, and each stabilizing standard having a vertical extension providing ground stabilization under vertical controlled power.

7. A grapple truck with a side loader comprising:
a truck with a front-end cab, front and rear wheels, an elongated truck chassis and a truck bed open top box movably mounted on said chassis, said truck box defined by longitudinal opposing bed sidewalls, and further defined by a forward wall behind said cab and a rear wall at the end of the open top box;
a recess extending inboard into said truck bed along a forward portion of one sidewall defined by opposing fore and aft lateral recess walls and an inboard recess backwall;
a substantially J-shaped side loader vertically and pivotally movable in and above said recess, said side loader forming at its lower extremity a debris collection scoop and said side loader having an upper leg plate extending from said scoop to its upper extremity which upper extremity pivots with respect to said one sidewall;
said scoop open substantially beneath said one sidewall and recessed at or inboard a plane defined by said one sidewall, said scoop having a loading outboard facing terminal edge substantially at or below an upper wheel line of defined by front and rear wheels beneath said one sidewall, thereby adapted to permit manual loading of debris into said scoop over said terminal edge;
a power lift system to first raise said side loader from a lower, loading position and thereafter pivot said side loader to an inverted upper dump position whereat said scoop discharges debris into said open top box;
an articulated boom having a boom support mounted on said chassis and an elongated articulated arm swivel mounted on said boom support, said articulated arm having at least three degrees of motion including a longitudinal arm extension, said articulated boom and arm terminating in a grapple jaw, said grapple jaw having a closed position adapted to grab and capture debris and having an open position adapted to release debris into said open top box;
a boom power and control system for said articulated boom, articulated arm and grapple jaw and adapted to extend said grapple jaw above and beyond said open top box;

said articulated boom and articulated arm having a stored position with a foreshortened longitudinal arm span wherein said grapple jaw rests atop a truck box floor and said articulated boom and articulated arm are longitudinally and laterally within said open top box.

8. The grapple truck as claimed in claim 7 wherein a lower extremity of said scoop is either substantially coextensive with or below a longitudinal line through respective front and rear wheel rotational centerlines and wherein said scoop in its lower loading position is beneath said one sidewall.

9. The grapple truck as claimed in claim 8 including a pair of motorized stabilizing standards, one standard for each side of said truck, each stabilizing standard laterally extending outboard said chassis and a respective sidewall under lateral controlled power, and each stabilizing standard having a vertical extension providing ground stabilization under vertical controlled power.

10. The grapple truck as claimed in claim 7 wherein during operation, said articulated boom and articulated arm have multiple operative positions wherein said arm is adapted to extend said grapple jaw over and longitudinally and laterally beyond said open top box.

11. The grapple truck as claimed in claim 7 wherein said rear wall of said truck bed includes a dump door and the grapple truck includes a chassis lift coupled between said chassis and said truck bed, said lift pivotally raising a forward end of said truck bed and adapted to discharge debris from said truck box via said dump door.

12. The grapple truck as claimed in claim 7 wherein said power lift system for said side loader is either a channel-guided lifter or a direct lift and pivot system or an electric motor drive.

13. The grapple truck as claimed in claim 7 wherein said power lift system for said side loader is a channel-guided lifter with fore and aft candy-cane shaped channels, said power lift system including a controllable pneumatic or hydraulic drive cylinder first vertically lifting said side loader and then inverting said side loader to said dump position.

14. The grapple truck as claimed in claim 13 including articulated power linkages between said drive cylinder and said side loader.

15. The grapple truck as claimed in claim 14 including a knuckle transmission between said articulated power linkages and said side loader.

16. The grapple truck as claimed in claim 7 wherein said power lift system for said side loader is a direct lift and pivot system including one or more hydraulic or pneumatic power lifts to pivotally raise said J-shaped side loader from a lowered position permitting said manual loading of debris and an upper inverted dump position whereat said J-shaped side loader is adapted to displace debris from said J-shaped scoop into said open top box.

17. The grapple truck as claimed in claim 7 wherein J-shaped side loader defines a substantially vertical common wall and wherein said scoop is longitudinally truncated on said common wall, the grapple truck further including a debris bin vertical transport adjacent said truncated scoop and having, on said common wall, an upper bin hook and a lower bin hook adapted to capture complementary debris bin hook-bars.

18. A side loader and bin carrier movably mounted on a grapple truck, said grapple truck providing a controllable source of motive power adapted to move said carrier substantially up and down with respect to an elongated truck frame and invert said carrier over said grapple truck, said grapple truck having an elongated open top truck bed container on said truck frame, said truck bed container having truck bed container sidewalls extending longitudinally over said truck bed, a recess extending inboard into said truck bed along a forward portion of one sidewall defined by opposing fore and aft lateral recess walls and an inboard recess backwall, said grapple truck including a grapple articulated arm terminating in grapple jaws which grapple articulated arm and jaws extend over said open top truck bed container in a first stabilized, stationary position and, in at least one operating position, laterally swing away from the open top truck bed container to seize and grapple debris below and laterally disposed away from said open top truck bed container, the side loader and bin carrier comprising:

an integral side loader and bin carrier having a common back plate, said carrier having an open top side loader and a debris bin vertical transport, said common back plate forming an inboard wall of said side loader and a vertical support plate for said bin vertical transport, said side loader and bin carrier vertically and pivotally movable in and above said recess;

said open top side loader having opposing, laterally outboard extending sidewalls and an outer facing wall spaced apart and opposite from said inboard wall of said side loader such that a containment side loader is formed by said side loader inboard wall, said opposing lateral sidewalls and said outer facing wall;

said debris bin vertical transport having, on said vertical support plate, an upper bin hook and a lower bin hook adapted to capture complementary debris bin hook-bars;

forward and rearward rollers carried by said common back plate;

forward and rearward track channels adapted to capture and movably retain therein respective forward and rearward rollers for said side loader and bin carrier, said track channels affixed forward and aft on outboard segments of said one truck bed sidewall, each track channel having a substantially straight vertical ascent run and an upper loop run which loop run curves over an upper edge of said one truck bed sidewall;

forward and rearward arm sets movably connected to said common back plate, at least one powered arm set having at least two articulating motive arms movably coupled at one end to said common back plate and coupled, at an opposite end, to respective pivotal axles, said pivotal axles mounted adjacent said upper edge of said one truck bed sidewall, the pivotal axle for the powered arm set being a drive axle;

a knuckle transmission coupled between said controllable source of motive power and said powered arm set via said drive axle and providing rotational movement to said drive axle thereby raising said side loader and bin carrier from said load position, when said carrier is at its lowermost position, to a dump position when said carrier is overturned at its uppermost position above and laterally atop said open top truck bed;

in said dump position, said open top side loader clearing said recess backwall, thereby permitting said side loader and bin carrier to clear said recess backwall during carrier transition between said load position to said dump position.

19. A side loader and bin carrier as claimed in claim 18 wherein said controllable source of motive power is a pneumatic or hydraulic cylinder with an extendible actuator, said actuator coupled to the upper terminal end of said powered arm set.

20. A side loader and bin carrier as claimed in claim 1 wherein said knuckle transmission is one of a geared transmission or a series of articulating transmission plates rotatably coupled between said drive axle and said controllable source of power.

\* \* \* \* \*